United States Patent
Wu et al.

(10) Patent No.: US 12,391,825 B2
(45) Date of Patent: Aug. 19, 2025

(54) THERMOPLASTIC POLYMER COMPOSITION FOR MICRO 3D PRINTING AND USES THEREOF

(71) Applicants: Qinghua Wu, Toronto (CA); Yimu Zhao, Mississauga (CA); Milica Radisic, Toronto (CA)

(72) Inventors: Qinghua Wu, Toronto (CA); Yimu Zhao, Mississauga (CA); Milica Radisic, Toronto (CA)

( * ) Notice: Subject to any disclaimer, the term of this patent is extended or adjusted under 35 U.S.C. 154(b) by 879 days.

(21) Appl. No.: 17/520,303

(22) Filed: Nov. 5, 2021

(65) Prior Publication Data
US 2022/0145059 A1     May 12, 2022

Related U.S. Application Data

(60) Provisional application No. 63/110,591, filed on Nov. 6, 2020.

(51) Int. Cl.
| | |
|---|---|
| *C08L 25/10* | (2006.01) |
| *B29C 64/153* | (2017.01) |
| *B29K 23/00* | (2006.01) |
| *B29K 25/00* | (2006.01) |
| *B33Y 10/00* | (2015.01) |
| *B33Y 70/00* | (2020.01) |
| *C08L 23/0807* | (2025.01) |

(52) U.S. Cl.
CPC ............ *C08L 25/10* (2013.01); *B29C 64/153* (2017.08); *C08L 23/0838* (2013.01); *B29K 2023/08* (2013.01); *B29K 2025/08* (2013.01); *B33Y 10/00* (2014.12); *B33Y 70/00* (2014.12)

(58) Field of Classification Search
None
See application file for complete search history.

(56) References Cited

U.S. PATENT DOCUMENTS

| | | | |
|---|---|---|---|
| 2017/0274594 A1* | 9/2017 | Ng | B33Y 30/00 |
| 2019/0126541 A1* | 5/2019 | Chaffins | B29C 64/165 |
| 2021/0179878 A1* | 6/2021 | Stasiak | B29C 64/165 |
| 2022/0024125 A1* | 1/2022 | Abstreiter | B33Y 40/20 |
| 2023/0027896 A1* | 1/2023 | Fry | C08K 3/013 |

FOREIGN PATENT DOCUMENTS

| | | | |
|---|---|---|---|
| CN | 100580051 | * | 4/2008 |
| CN | 109021573 | * | 12/2018 |

OTHER PUBLICATIONS

Jeon et al. (Composites Part B: Engineering vol. 189, May 15, 2020, 107912). (Year: 2020).*
Li et al. (Macromol. Mater. Eng. 2017, 302, 1700211). (Year: 2017).*
Macine translation of CN 109021573 (Year: 2018).*
Machine translation of CN 100580051 (Year: 2010).*

* cited by examiner

*Primary Examiner* — Robert T Butcher
(74) *Attorney, Agent, or Firm* — Smart & Biggar LP

(57) ABSTRACT

A composition for extrusion and deposition by a three-dimensional (3D) printer is provided. The composition comprises a thermoplastic elastomer (TPE), particulate matter having particles in the range of about 5 nm to about 10 μm in diameter, and a solvent. Uses of the composition for 3D printing microstructures, including multiwall plate devices, are also provided.

19 Claims, 45 Drawing Sheets

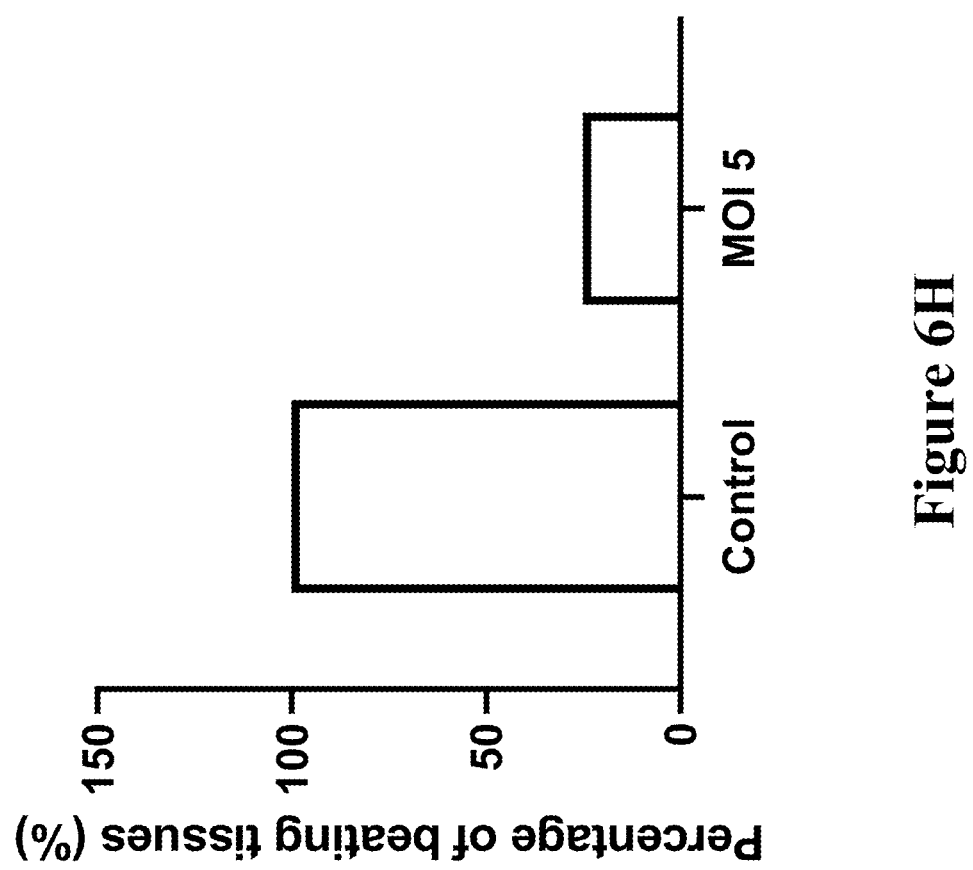

THERMOPLASTIC POLYMER COMPOSITION FOR MICRO 3D PRINTING AND USES THEREOF

CROSS-REFERENCE TO RELATED APPLICATIONS

The present disclosure claims priority from U.S. provisional patent application no. 63/110,591, filed Nov. 6, 2020, the entirety of which is hereby incorporated by reference.

FIELD

The present disclosure relates to a thermoplastic polymer ink composition for 3D printing and its use in producing micro-scale structures.

BACKGROUND

The pharmaceutical industry is facing unparalleled challenges to reduce costs and improve efficiency and accuracy of drug development. Organ-on-a-chip (OoC) technology can serve as an in vitro testing system closely recapitulating human physiology, which can ultimately improve the predictive power of current preclinical and clinical evaluation. Recent advances in OoC systems, have been developed to mimic biological and structural complexity of native tissue or organs, such as kidney (Wang, et al. 2019), brain (Wang, et al. 2018), liver (Maschmeyer, et al. 2015) and heart (Zhao, et al. 2019) models. More specifically, through a heart-on-a-chip platform, Zhao et al. demonstrated chamber-specific cardiac tissues with high physiological relevance and maturation, which served as in vitro models for drug screening (Zhao, et al. 2019). Many microphysiological models also demonstrated excellent control of extracellular environment, such as blood vessel networks (Zhang, et al. 2016), cancer metastasis OoC systems (Lai, et al. 2017) and physiomimetic laminar cardiac tissues (Lind, et al. 2017).

However, most studies in OoC systems have only operated as single use chips, with labor-intensive fabrication process and low-throughput characteristics in tissue culture and testing aspects. The need for automation and parallelization are crucial to make OoC systems more applicable and practical in drug developmental process. On the other hand, it is still challenging to develop OoC systems featuring high physiological relevance while increasing the throughput of chip fabrication as well as tissue cultivation.

SUMMARY

Advanced fabrication techniques, such as 3D printing, may be used to address the challenge. 3D printing truly offers a low-cost, highly flexible, easily scalable and efficient manufacturing technique (Chia and Wu 2015) for producing high-throughput devices. However, it is usually used to fabricate templates to mold conventional PDMS-based OoC systems, due to the limitations of printable materials and fabrication resolution (Amin, et al. 2016). In various examples, the present disclosure describes a 3D printable ink that may address demands for 3D printing for OoC applications. Polymer-particle composites can exhibit unique material properties, which may be useful for new material functions. Semiconductor quantum dots have been used as optical nanoplatforms for biomedical applications such as cell imaging (Benayas, et al. 2015) and drug delivery (Bilan, et al. 2016), due to their multifaceted properties such as photoluminescence, high photostability and long fluorescence lifetime.

Herein, there is disclosed a novel 3D printable composite ink based on thermoplastic elastomer and detectable particulate matter (e.g., quantum dots). Examples of the disclosed composition are described that are shown to exhibit highly elastic and fluorescent properties. Examples are also described that demonstrate a simple yet efficient strategy to generate a reusable multiwell plate device for heart-on-a-chip applications using the disclosed composition. The multiwell plate device, featuring built-in 3D-printed composite sensors for non-invasive evaluation and electrodes for electrical stimulation, provides a higher throughput platform to generate 3D cardiac tissues and mature them for a wide range of applications such as drug screening. The present disclosure also enables the use of the disclosed composition for 3D printing other micro-scale structures (not limited to microwire structures) for other applications (not limited to heart-on-a-chip applications).

In some applications, the present disclosure relates to a composition for extrusion and deposition by a three-dimensional (3D) printer, the composition comprising: a thermoplastic elastomer (TPE), particulate matter having particles in the range of about 3 nm to about 10 μm in diameter, and a solvent.

In some applications, the TPE is selected from at least one of: thermoplastic polyurethane (TPE-U), thermoplastic copolyester (TPE-E), thermoplastic polyamide, polyolefin blend, and poly(styrene-ethylene-butylene-styrene) (SEBS).

In some applications, the TPE is poly(styrene-ethylene-butylene-styrene) (SEBS). In some applications, the particulate matter comprises quantum dots (QDs). In some applications, the QDs are CdSe/CdS core/shell quantum dots. In some applications, the QDs are stabilized with octadecylamine ligands. In some applications, the QDs are in the range of about 3 nm to about 10 nm in diameter. In some applications, the concentration of QDs by weight in the TPE is in the range of about 0.01% to about 10%.

In some applications, the solvent is toluene, chloroform, or a combination of the two.

In some applications, the particulate matter comprises particles having a property to enable detectability based on at least one of: fluorescence; conductivity; or magnetism.

In some applications, the particulate matter comprises at least one of: polystyrene micro-particles, polyester micro-particles, rhodamine, or carbon dot-based fluorophore. In other applications, the particulate matter comprises at least one of: single carbon nanotubes, multiwall carbon nanotubes, carbon tubes, graphene, gold nanoparticles, silver nanoparticles, or platinum nanowire. In other applications, the particulate matter are iron oxide nanoparticle, FePt, NdFeB or SmCo5 alloys, or cobalt nanoparticles.

In some applications, the composition has a viscosity in the range of about 10 Ns/m2 to about 10,000 Ns/m2 under shearing.

In other applications, the present disclosure relates to use of the above composition for 3D printing a micro-scale structure. In some applications, the micro-scale structure is in the range of about 10 μm to about 200 μm in size.

In other applications, the micro-scale structure may be micro-wires printed onto a microwell plate, wherein the micro-wires are about 60 μm in diameter. In some applications, the use may be printing micro-wires onto the microwell plate at a 3D printing speed of about 1 mm/s to about 20 mm/s.

In some applications, the use may be to print the microwires onto the microwell plate at a 3D printing temperature of about 200° C. to about 220° C., and a 3D printing pressure in the range of about 0.1 MPa to about 0.5 MPa.

In further applications, the present disclosure relates to an apparatus for cultivation of cells, comprising: a substrate; and a micro-scale structure that is extruded and deposited on the substrate using a 3D printing process, wherein the above composition is 3D printed on the substrate to create the micro-scale structure.

A further understanding of the functional and advantageous aspects of the disclosure can be realized by reference to the following detailed description and drawings.

BRIEF DESCRIPTION OF THE DRAWINGS

Embodiments will now be described, by way of example only, with reference to the drawings, in which.

DETAILED DESCRIPTION

Figure 1A:
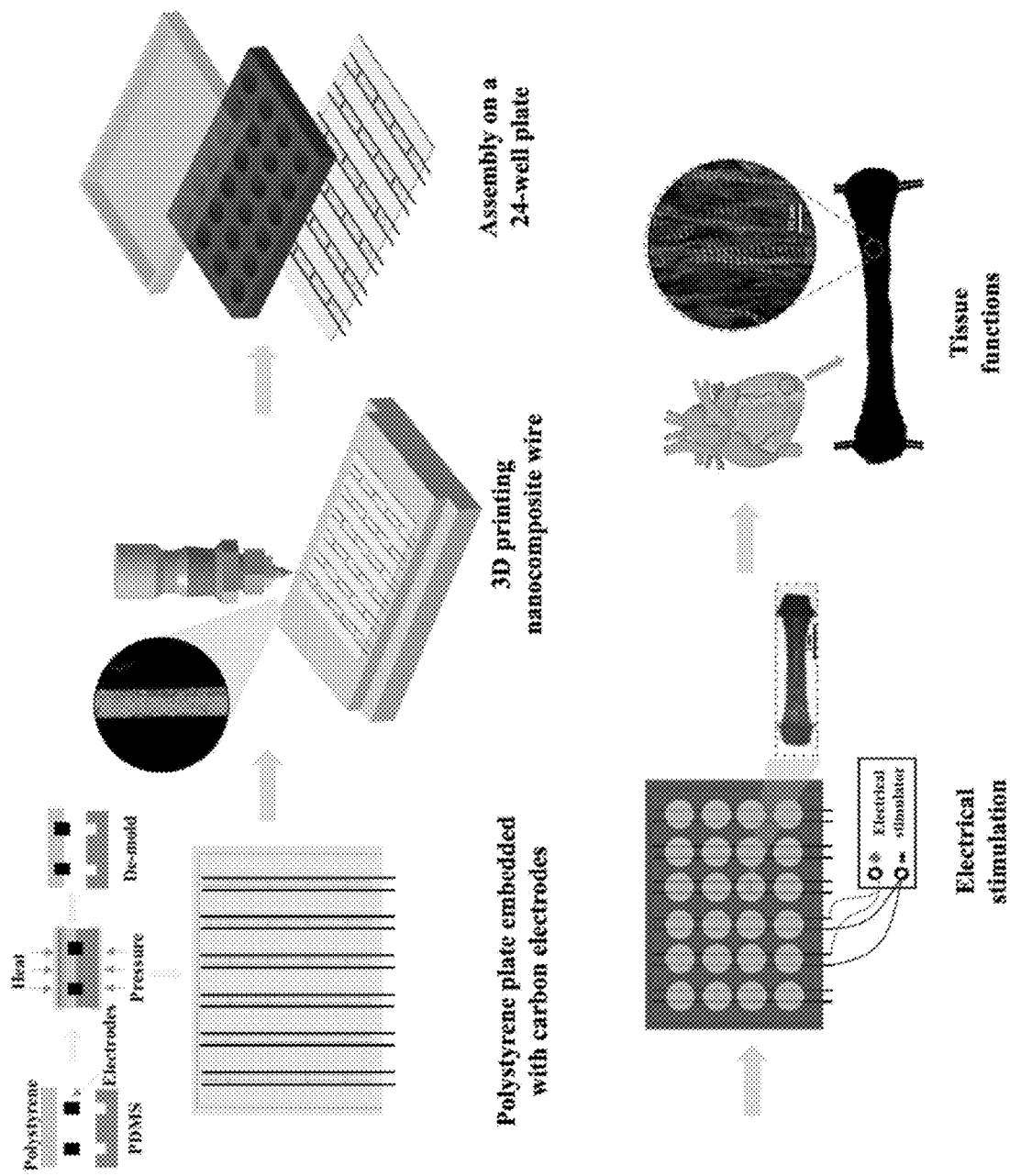
FIG. 1A shows schematic illustration of a fabrication process for micro-scale structures in a multiwell device, in accordance with examples of the present disclosure.

Various embodiments and aspects of the disclosure will be described with reference to details discussed below. The following description and drawings are illustrative of the disclosure and are not to be construed as limiting the disclosure. The drawings are not necessarily to scale. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in this specification including claims, the terms, "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately", when used in conjunction with ranges of dimensions of particles, compositions of mixtures or other physical properties or characteristics, are meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present disclosure.

Ink Composition

The present disclosure relates to a composition for extrusion and deposition by a three-dimensional (3D) printer. The composition includes a thermoplastic elastomer (TPE), particulate matter having particles in the range of about 5 nm to about 10 μm in diameter, and a solvent.

The TPE may be selected from thermoplastic polyurethane (TPE-U), thermoplastic copolyester (TPE-E), thermoplastic polyamide, polyolefin blend, poly(styrene-ethylene-butylene-styrene) (SEBS), and poly(styrene-ethylene-butylene-styrene) (SEBS).

The particulate matter comprises particles that have a property that enables detectability based on qualities such as fluorescence, conductivity, and/or magnetism. If detectability based on fluorescence is desired, the particulate matter in the composition may comprise one or more of quantum dots, polystyrene micro-particles, polyester micro-particles, rhodamine, and carbon dot-based fluorophore.

If detectability based on conductivity is desired, the particulate matter in the composition may comprise one or more of single carbon nanotubes, multiwall carbon nanotubes, carbon tubes, graphene, gold nanoparticles, silver nanoparticles, and platinum nanowire. If detectability based on magnetism is desired, the particulate matter in the composition may comprise one or more of iron oxide nanoparticle, FePt, NdFeB or SmCo5 alloys, and cobalt nanoparticles.

The incorporation of particulate matter into thermoplastic polymer matrices allows for fabrication of stable and uniform functional materials with low optical losses. Use of the present composition allows for the ability to scale up (nanometer, micrometers and macrometer), ease in processing, and the controlled incorporation of different particular matter with different detectable qualities. It takes advantage of the unique properties of the particulate matter while maintaining the versatile bulk mechanical properties of the polymetric matrices (highly elastic and flexible, with a strain higher than 120% and Young's modulus 500-850 kPa). The particulate matter helps to control fluorescence, conductivity, absorption, and biomolecule release. The TPE helps to control elastic modulus, ultimate tensile strength, and elongation at break i.e. mechanical properties. In that regard, the composition may have a viscosity in the range of about 10 $Ns/m^2$ to about 10,000 $Ns/m^2$ under shearing.

In the case when quantum dots (QDs) are used, the QDs may be CdSe/CdS core/shell quantum dots, where the diameter of the particles are in the range of about 3 nm to about 10 nm. When mixed with the TPE, the concentration of QDs by weight in the TPE may be in the range of about 0.01% to about 10%.

The incorporation of QDs into thermoplastic polymer matrices further allows for extrusion around melting temperature of 200° C., and the controlled incorporation of different QDs with tunable colors and emission strengths. Addition of the QDs to the TPE allows for improved function for QD-containing nanocomposites, as it takes advantage of the unique optical and electrical properties of the QDs while maintaining the versatile bulk mechanical properties of the polymetric matrices.

Encapsulation of QDs in a polymer matrix with uniform distribution and suppressed aggregation is important, because aggregation of QDs can lead to quenching and optical losses from scattering. The QDs may be stabilized with octadecylamine ligands in order to match the hydrophobic nature of TPE polymers, thus, enabling creation of well-dispersed QDs in the nanocomposite. The matched interface is able to reduce ligand loss and aggregation of QDs in the mixing process and helps to minimize water and oxygen molecules in cell media diffusion onto the QD surface. This helps to improve QD stability in TPE/QD nanocomposite inks.

In any of the above noted applications, the solvent may be toluene, chloroform, or a combination of the two. Toluene and chloroform have different vapor pressures (toluene: 3.8 kPa, chloroform: 26.2 kPa). The use of toluene allows the solvent to evaporate several second after filament deposition during 3D printing. The use of chloroform can allow the solidification of filament within a second after ink extrusion on the 3-axis stage. Specific desired solvent drying times may be achieved by mixing these two solvent in different ratios.

Below is a description of preparation of an example nanocomposite ink.

Although examples are described herein that make reference to a "nanocomposite" ink and other "nano" scale structures, it should be understood that the present disclosure is not limited to nanocomposites or nano-scale structures. As described throughout, the present disclosure describes composite inks that may include particulate matter in the nano scale or in the micro scale, and may be used for nano scale applications (e.g., 3D printing of nanowires) as well as for micro scale applications (e.g., 3D printing of micro scale structures). Further, the present disclosure in some examples makes reference to "biowire" structures. The term biowire may be used to refer to wire structures (which may be nano scale or micro scale structures), which may be 3D printed using the disclosed composition, which may be used for cell cultivation applications. The present disclosure is not limited to wire structures, and may be applicable to other structures (e.g., posts, mesh, etc.) that may be 3D printed using the disclosed composition.

Examples of the disclosed composition are now described. It should be understood that these examples are not intended to be limiting.

Nanocomposite Ink Preparation

TPE/QD nanocomposites were prepared by mixing core-shell CdSe/ZnS quantum dots (from Sigma-Aldrich) and poly(styrene) (ethylene/butylene)-(styrene) copolymers thermoplastic elastomers (TPE). In brief, TPE polymer was mixed with QDs (6 nm in diameter, from Sigma-Aldrich) in toluene to obtain solution concentrations ranging from 0.01% to 10% of QDs by weight in polymer.

The nanocomposite solutions were cast into a glass Petri dish. After solvent evaporation overnight in ambient conditions, the nanocomposite inks were mechanically mixed under 200° C. for 10 mins and then baked in an oven under vacuum at 80° C. for 3 h. Another type of QDs (8 nm in diameter, powder, from Sigma-Aldrich) were mechanically mixed with TPE polymer under 200° C., for 30 mins, to obtain QDs concentration from 0.01% to 10%.

Use of Ink Composition

The above described ink composition may be used for 3D printing of micro-scale structures. For example, the micro-scale structures may be in the range of about 10 μm to about 200 μm in size. The above described composition may also be used for 3D printing of nano-scale structures.

In some applications, the above described ink composition may be used to 3D print micro-wires onto a microwell plate, where the micro-wires are about 60 μm in diameter. Given the properties of the present ink composition, it may be used for printing micro-wires onto the microwell plate at a 3D printing speed of about 1 mm/s to about 20 mm/s, at a 3D printing temperature of about 200° C. to about 220° C., and a 3D printing pressure in the range of about 0.1 MPa to about 0.5 MPa.

Below is a description of preparation of example apparatuses for cultivation of cells using the above described ink composition, and their uses.

Fabrication of Base Plate with Built-in Carbon Electrodes

Soft-lithography was used to fabricate SU-8 photoresist master mold generated using a photomask. Patterns designed with AutoCAD were used to produce the photomask, with repeated rectangular microwells (5×1 mm$^2$, L×W) and groves (78×0.2 mm$^3$, L×W). The distance of adjacent microwells in the patterns was adjusted to be compatible with the 24-well and 96-well plate dimensions. A negative PDMS mold was produced by mixing silicone elastomer base and a curing agent at a weight ratio of 5:1 and pouring the mixture onto the SU-8 master mold for curing at room temperature.

Plasma bonding was used to fix the PDMS mold to a silicon wafer. The silicon wafer after bonding was used to produce polystyrene base plate with electrodes. In brief, a blank polystyrene sheet and carbon electrodes (Cat No. AR-14, Ohio Carbon Blank) carbon were placed on the PDMS mold and loaded into a hot embosser (EVG 520). The polystyrene base plate with built-in carbon electrodes was generated by thermal bonding at a temperature of 180° C. and a pressing force of 3000 N.

3D Printing of TPE/QD Nanocomposite Microwires

The nanocomposite ink was loaded into a temperature-controlled vat of a 3D bioprinter (RegenHU Ltd., Switzerland). 3D printing was performed using a computer-controlled translation stage and a three-axis positioning platform. The TPE/QD nanocomposite inks with different QD concentrations (0.01-0.1%) were extruded through a micronozzle (60-200 μm) and deposited on a three-axis positioning platform, at 190-210° C. and 0.1-0.5 MPa with a controllable robot velocity of 5-20 mm/s. An array of nanocomposite micro-wires (8 cm×60 μm diameter) was directly deposited on the polystyrene base plate embedded with electrodes. Alternatively, solvent-based 3D printing can be used to fabricate TPE/QD microstructures at room temperature by using TPE/QD nanocomposite inks (prepared by dissolving in toluene).

Fabrication of Multi-Well Plate Devices

After 3D printing of TPE/QD nanocomposite microwires, a polystyrene plate base with electrodes and microwires was assembled onto a bottomless 96-well plate, by thermal bonding using a heated press device (Carver 4386), for 5 mins, at a pressing force of 500 bar and a temperature of 120° C. In brief, the bottomless 96-well plate (base up) was placed on the bottom platen of the press device. The base plate with microwires and electrodes was placed on the top of the bottomless plate, with the alignment of the nanocomposite microwires in the center of wells. A 24-well plate device was also fabricated by thermally bonding a bottomless 24-well plate.

Nanocomposite Microwire Force-Displacement Curves

The force-displacement curves of microwires were measured by using a microscale mechanical tester (MicroSquisher, CellScale). Customized tips (500 μm, 700 μm, and 800 μm) were adhered on the tungsten probe to generalize the curvature and diameter of tissues on the nanocomposite wires. The customized tips were generated from an SU-8 molds by soft lithography. Each probe tip was placed at one side of the microwell in a multiwell plate and moved forward in the middle point of the nanocomposite wire at a velocity of 2.5 μm/s, while applying force perpendicular to the long axis of the wire. The probe displacement, time and force were recorded for generating force-displacement curves. The equations of force-displacement using different customized tips are: $y=1.86\times10^{-5}x^3+0.0021x^2+0.50x$ (500 μm-tip), $y=4.66\times10^{-5}x^3+0.0035x^2+0.54x$ (700 μm-tip), and $y=1.61\times10^{-5}x^3+0.0057x^2+0.20x$ (800 μm-tip), Prism 9.0 was used for data analysis and generating fitted curves, 95% confidence interval curves and $R^2$ values.

Generation of Engineered Cardiac Tissues

Human iPSC cardiomyocytes (CMs) were differentiated from hiPSC line BJ1D by using monolayer differentiation protocols (Lian, et al. 2013; Yang, et al. 2008). The disassociation of cardiomyocytes into single cells was performed at day 21 of stem cell differentiation, using previous methods (Yang, et al. 2008). The disassociated cells and cardiac fibroblast (Lonza, NHCF-V) were mixed to reach a cell number ratio of 10:1. The resultant cells were remixed in a collagen hydrogel at a cell number of $5.5 \times 10^7$ cells/mL. The collagen hydrogel (500 µL) was formed by mixing rat tail collagen (153 µL at 9.82 mg/mL, Corning), 1×M199 (50 µL, Sigma), Matrigel (75 µL, BD Biosciences), deionized sterile $H_2O$ (167 µL), NaOH (5 µL at 10 mM, Sigma) and $NaHCO_3$ (50 µL at 2.3 mM, Sigma).

The cell-laden hydrogel (2 µL per microwell) was seeded in the microwells of the plate. After placing a droplet of media on the wall of the well to keep the moisture, the plate was incubated at 37° C. and 5% $CO_2$ for 10 mins to allow the hydrogel gelation, followed by adding 2 mL media per well. After cell seeding, the cardiac tissues were incubated for 7 days. The tissue morphology was observed daily using an Olympus CKX41 inverted microscope.

Electrical Stimulation

The carbon electrodes along the microwells in the 24-well plate device, were connected to an external electrical stimulator (Grass Technology S88X Square Pulse Stimulator). Electrical stimulation protocol of weekly 1 Hz increase in frequency was implemented for tissue maturation. 1 Hz or 2 Hz was set for initiating the electrical stimulation. The stimulation voltage was adjusted weekly to 1.5 times the average excitation threshold.

Immunostaining and Confocal Microscopy

Cardiac tissues were fixed with 4% paraformaldehyde (Sigma-Aldrich), permeabilized with 0.1% Triton X-100 (Alfa Aesar) in PBS and blocked with 5% goat serum in PBS. Immunostaining was performed using the following antibodies: a primary mouse anti-cardiac Troponin T (Invitrogen; Catalogue number: MA5-12960; 1:200) and a secondary goat anti-mouse-Alexa Fluor 647 (Invitrogen; Catalogue number: A-21037; 1:400). Phalloidin-Alexa Fluor 488 (Invitrogen; Catalogue number: A-12379; 1:200) was used to stain F-actin fibers. Confocal fluorescent microscopy images were generated using an Olympus FluoView 1000 laser scanning confocal microscope.

Transmission Electron Microscopy

To characterize QD in QD/TPE nanocomposite using TEM, 40 µL of QD/TPE suspension was pipetted to 200 mesh copper grids (Electron Microscopy Sciences). The grids were then stained with saturated uranyl acetate (2.5%) for 5 min, followed by DI water wash. The grids were photographed on a Hitachi H7000 transmission electron microscope at an acceleration voltage of 80 kV.

Contractile and $Ca^{2+}$ Transient Recording

To test contractile properties of the tissues, cardiac cultured in a multiwell plate was placed in a chamber (37° C., 5% $CO_2$) of fluorescent microscope (Olympus Corporation). Bright field videos of the tissues were taken to acquire all measurements of biowires for force calculation. Prior to video recording, ET of the tissue was observed upon pacing by an external stimulator (Grass Technology S88X Square Pulse Stimulator). Videos were recorded on fluorescent polymer wires under the microscope (10× objective) to monitor tissue consecutively and synchronously under electrical stimulation at a voltage of 2 times the ET at a frequency from 1 to 3 Hz. The videos were analyzed using a custom MATLAB software as described previously (Zhao, et al. 2019).

Prior to drug testing, compounds (nifedipine, lidocaine) were diluted in culture media at concentrations 1000 times higher than the desired final concentration. Cardiac cultured in a multiwell plate was placed in a chamber (37° C., 5% $CO_2$) of fluorescent microscope (Olympus Corporation). ⅓rd of the media was extracted from one well of the multiwell-plate device. The drug was added to the extracted media and then slowly injected back into the well. After 10-15 min, videos in the green and red channel were recorded. The force and $Ca^{2+}$ transients were measured under electrical stimulation at 1 Hz. Before measuring $Ca^{2+}$ transients of tissues, cardiac tissues were incubated with the $Ca^{2+}$ dye fluo-4 NW (Thermo Fisher) for 40 mins at 37° C. $Ca^{2+}$ transients were recorded under fluorescent microscope using a green-light channel ($\lambda_{ex}$490 nm/$\lambda_{em}$525 nm). The ratio of peak fluorescence to baseline fluorescence intensity was measured the relative $Ca^{2+}$ change in the tissues by Image J software (NIH) as described previously (Zhao, et al. 2019). Prism 9.0 was used for all the calculation and figure plots.

SARS-CoV-2 Infection on Cardiac Tissues in the Platform

SARS-CoV-2 virus was extracted from patient samples at Sunnybrook Hospital (Toronto, Canada) and was acquired from CL-3 facility using a previous described method (Banerjee, et al. 2020). SARS-CoV-2 infections on cardiac tissues were performed at multiplicity of infection (MOI) of 5 after two weeks of tissue cultivation. The tissues were washed by PBS and incubated with coronavirus for one hour in Minimum Essential medium (EMEM) (VWR). The media was replaced with customized Induction 3 Medium (I3M) (StemPro-34 complete media, 1% GlutaMAX, 20 mM HEPES, 1% Penicillin-Streptomycin, Life Technologies; 150 µg/mL transferrin, 213 µg/mL 2-phosphate Ascorbic Acid, Sigma-Aldrich).

Results

Device Fabrication and TPE/QD Nanocomposite Ink Preparation

As noted above, the present disclosure relates to a composite ink and a simple and rapid fabrication approach for scalable and high-throughput production of micro-scale (or nano-scale devices), such as heart-on-a-chip platforms. In an example, a custom polystyrene base plate embedded with an array of carbon electrodes was created via a single hot embossing step (see FIG. 1A). An array of soft elastic microwires (8 cm×60 µm diameter) was then 3D printed using the new nanocomposite elastomer under controlled temperature for direct arraying on the base plate and assembled onto a bottomless 24-well plate by thermal bonding. Through this new fabrication process, the Biowire II platform (Zhao, et al. 2019) may be fabricated via an entirely manual process is scaled up from an 8-microwell chip to a patterned 24-well plate, thus speeding up the platform production per tissue well by 17,250%.

Figure 1B:
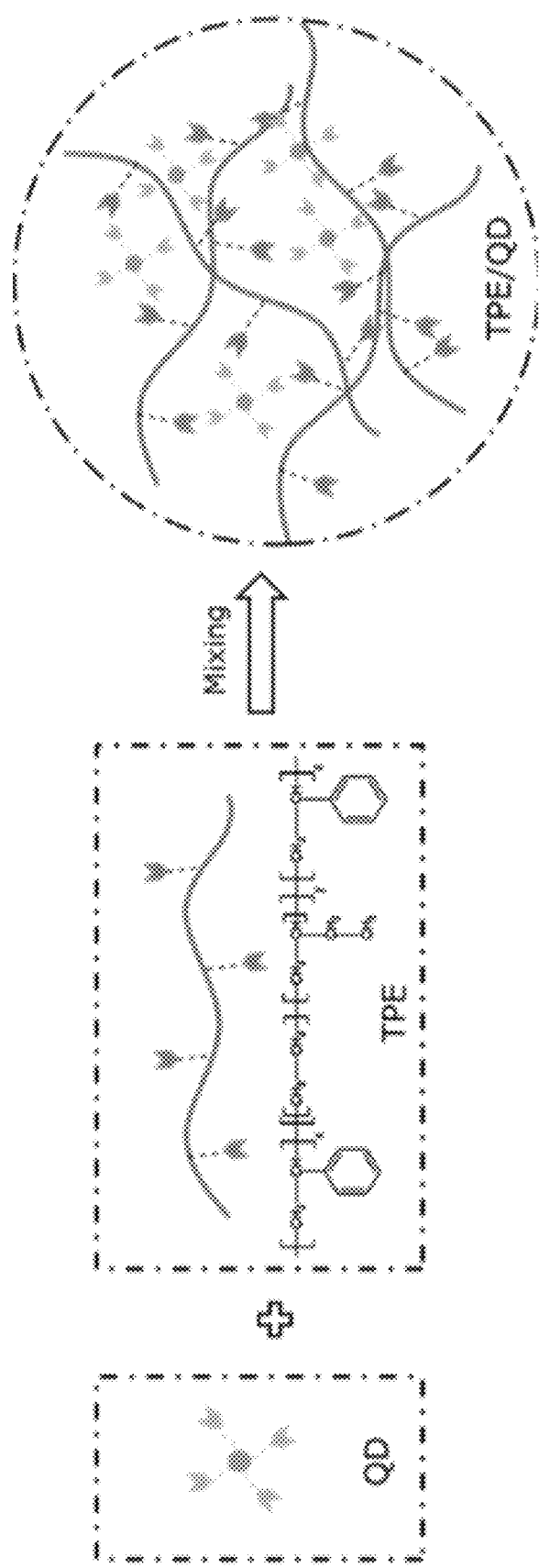
FIG. 1B shows schematic of composite ink preparation consisting of quantum dots (QD) and thermoplastic elastomer (TPE), in accordance with examples of the present disclosure.
Figure 1C:
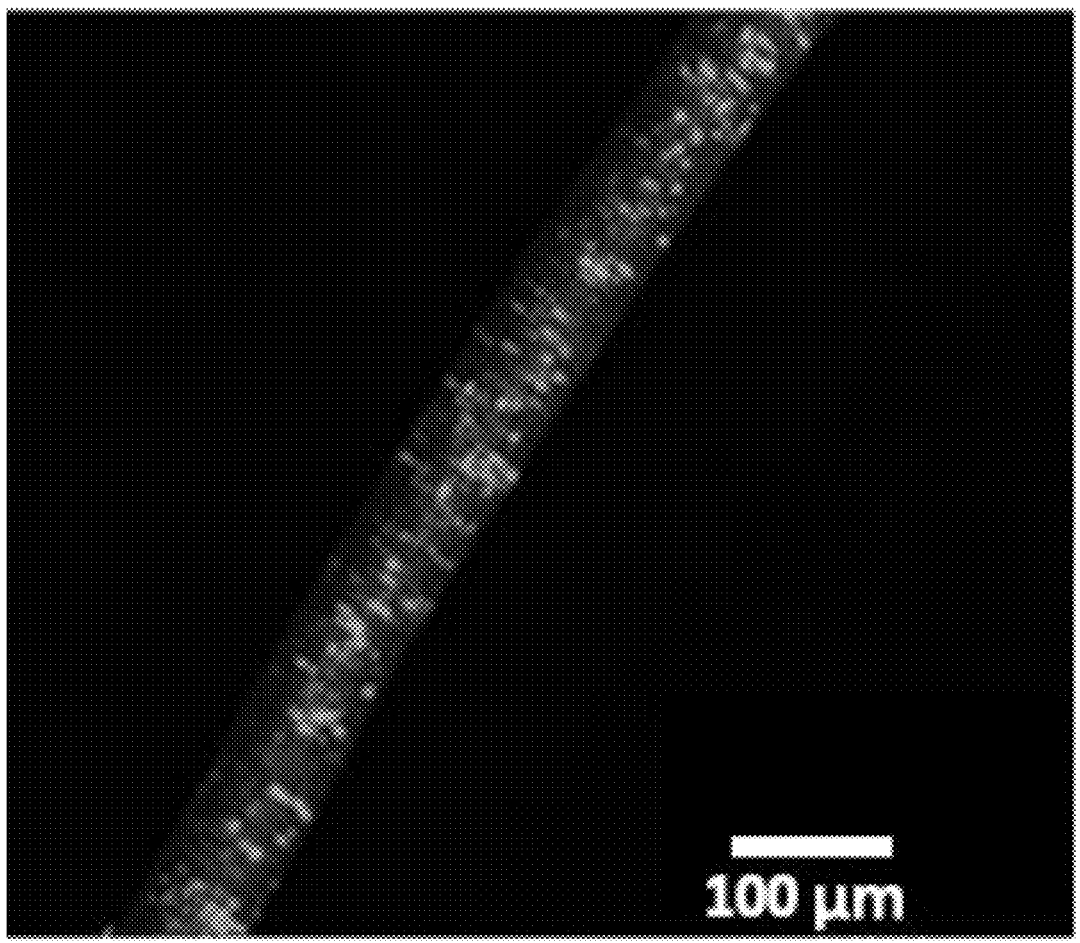
FIG. 1C shows fluorescence microscopy of an example nanocomposite wire.
Figure 1D:
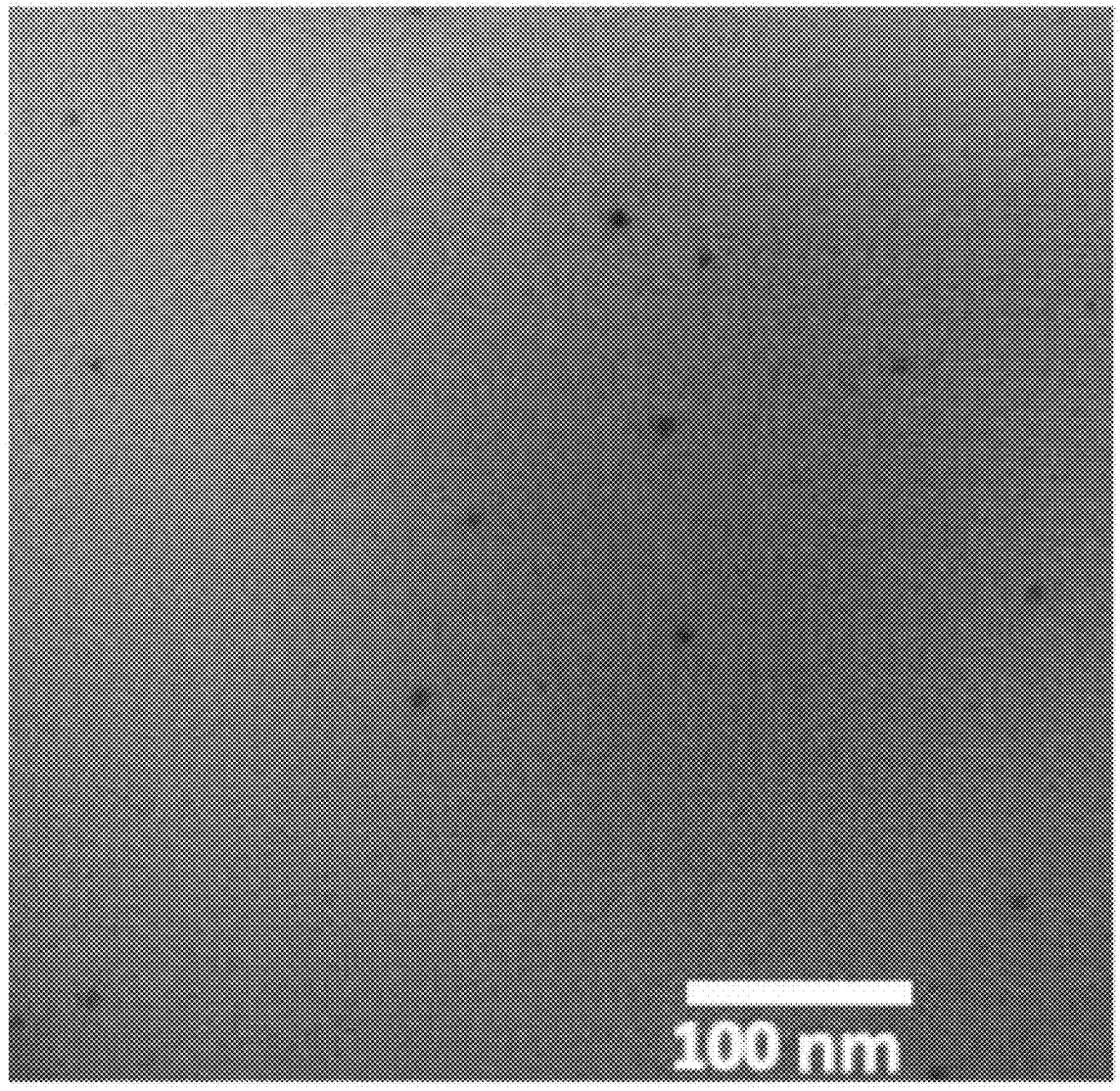
FIG. 1D shows TEM micrograph of a ~200 nm thick composite film, showing that the QD nanoparticles are well-dispersed in the thermoplastic elastomer, in an example of the present disclosure. Scale bar: 100 μm.
Figure 1E:
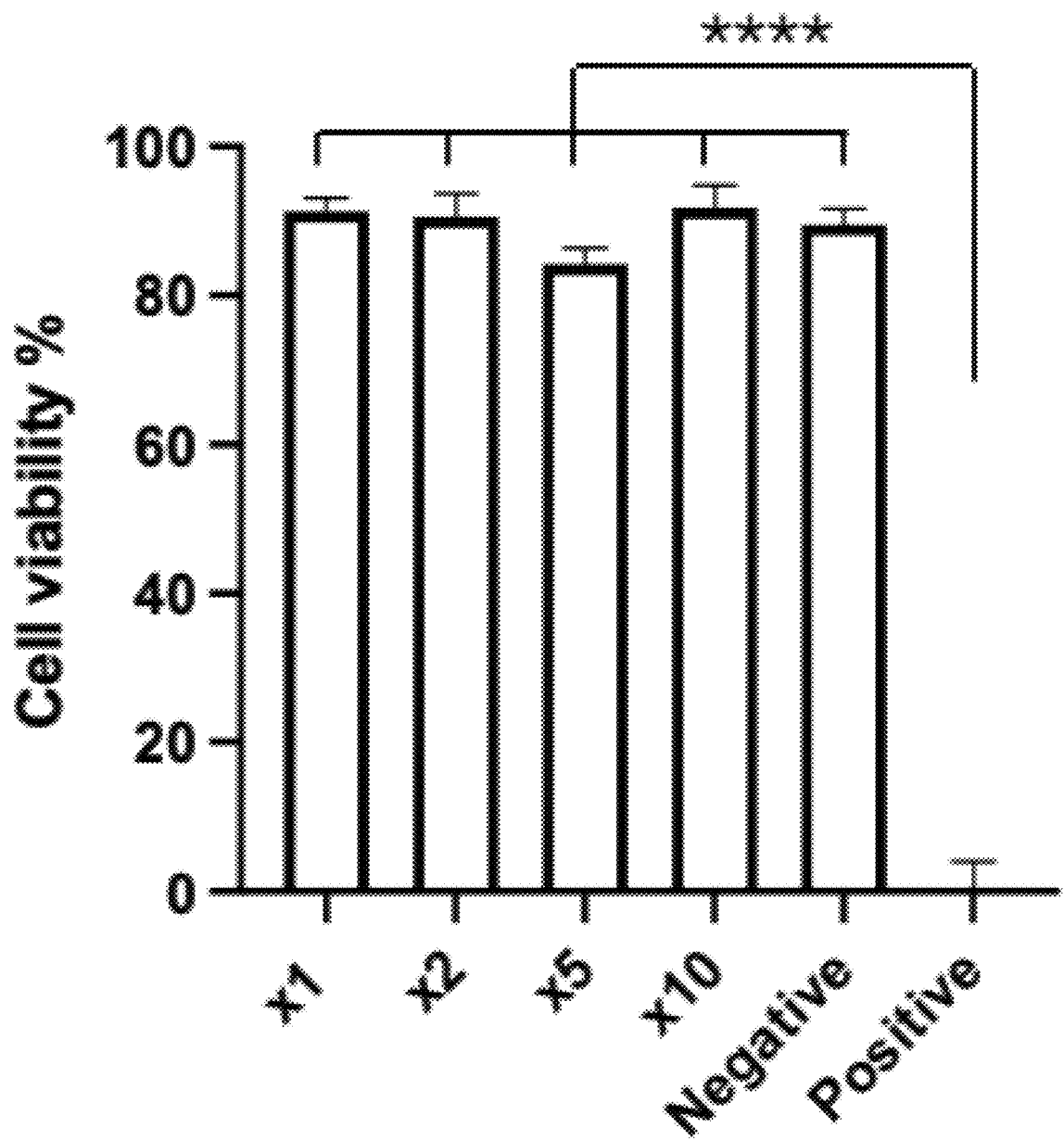
FIG. 1E shows lactate dehydrogenase assay on cardiac fibroblasts cultured for 24 hours in dilutions of culture media exposed to the nanocomposite for 1 month. Negative control contains no culture media exposed to the nanocomposite. Positive control is culture media containing 1% Triton-X. Data presented as mean±stdev, n≥3, ****p<0.0001 indicates significant difference than positive control, one-way ANOVA.

Nanocomposite elastomer microwires (see FIG. 1A) provided anchor points for the support of trabecula-like cardiac tissue. Detection of contraction force depends on the deflection of the elastic microwires. Thus, thermoplastic elastomer (TPE) was rendered fluorescent by core-shell CdSe/ZnS quantum dots (QDs) (see FIG. 1B). QDs stabilized with octadecylamine ligands were used to match the hydrophobic nature of TPE polymers enabling creation of well-dispersed nanocomposites. The fluorescent microscopy (see FIG. 1C) and transmission electron microscopy (TEM, see FIG. 1D) images of a 3D printed microwire demonstrated that QD nanoparticles were clearly visible and well-dispersed in the material. Well-dispersed nanocomposites can be formed by creating better bulk polymer-ligand interface, due to the adaptation of QD surface chemical properties in the nanocomposite. The matched interface is able to reduce ligand loss of QDs in the mixing process and might minimize the diffusion of water and oxygen molecules to the QD surface, resulting in the improvement of QD stability in TPE/QD nanocomposite inks. Cell compatibility of QD/TPE nanocomposite was assessed by cultivating cardiac fibroblasts in dilutions of culture media obtained after 1 month incubation with the nanocomposites to account for possible leaching of toxic compounds. No cytotoxicity was identified by lactate dehydrogenase release (see FIG. 1E).

TPE/QD Nanocomposites Characterization

Figure 1F:
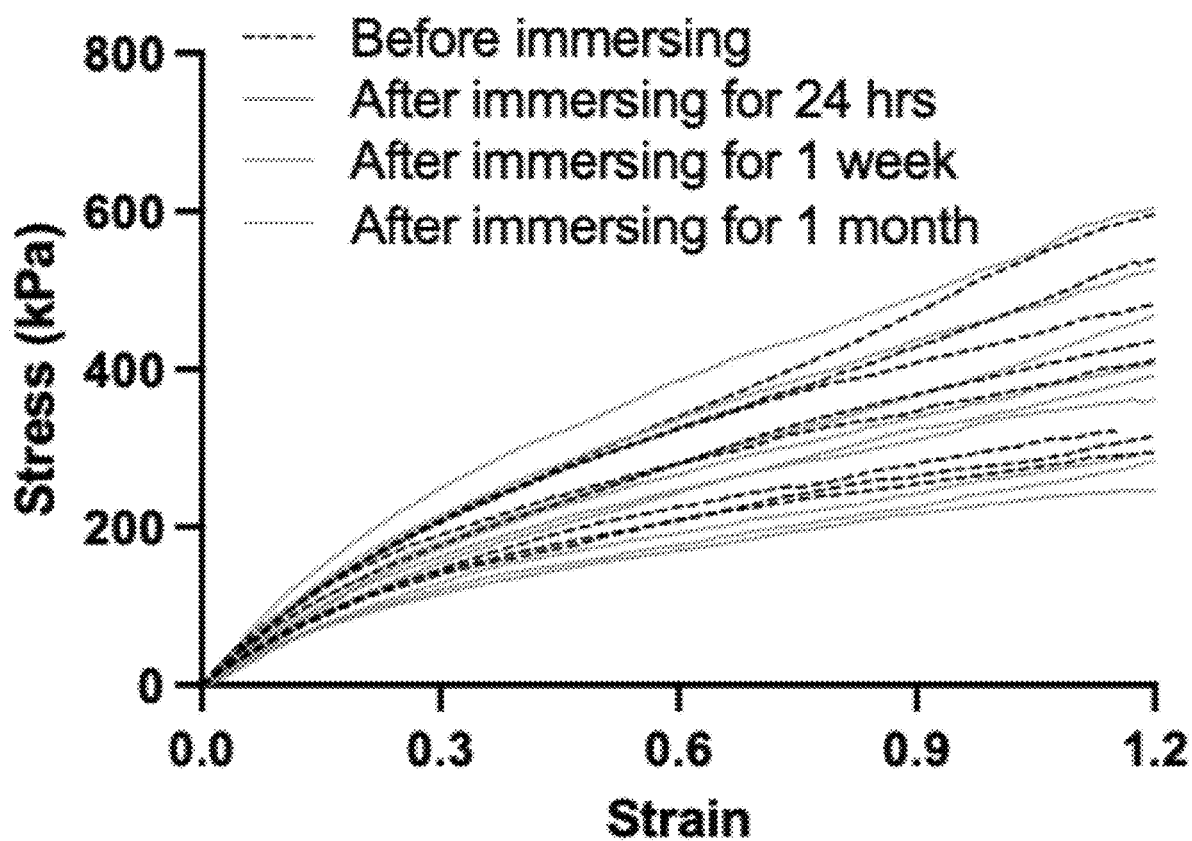
FIG. 1F shows stress-strain curves and FIG. 1G shows Young's modulus of bulk TPE/QD composites, in an example of the present disclosure.
Figure 1G:
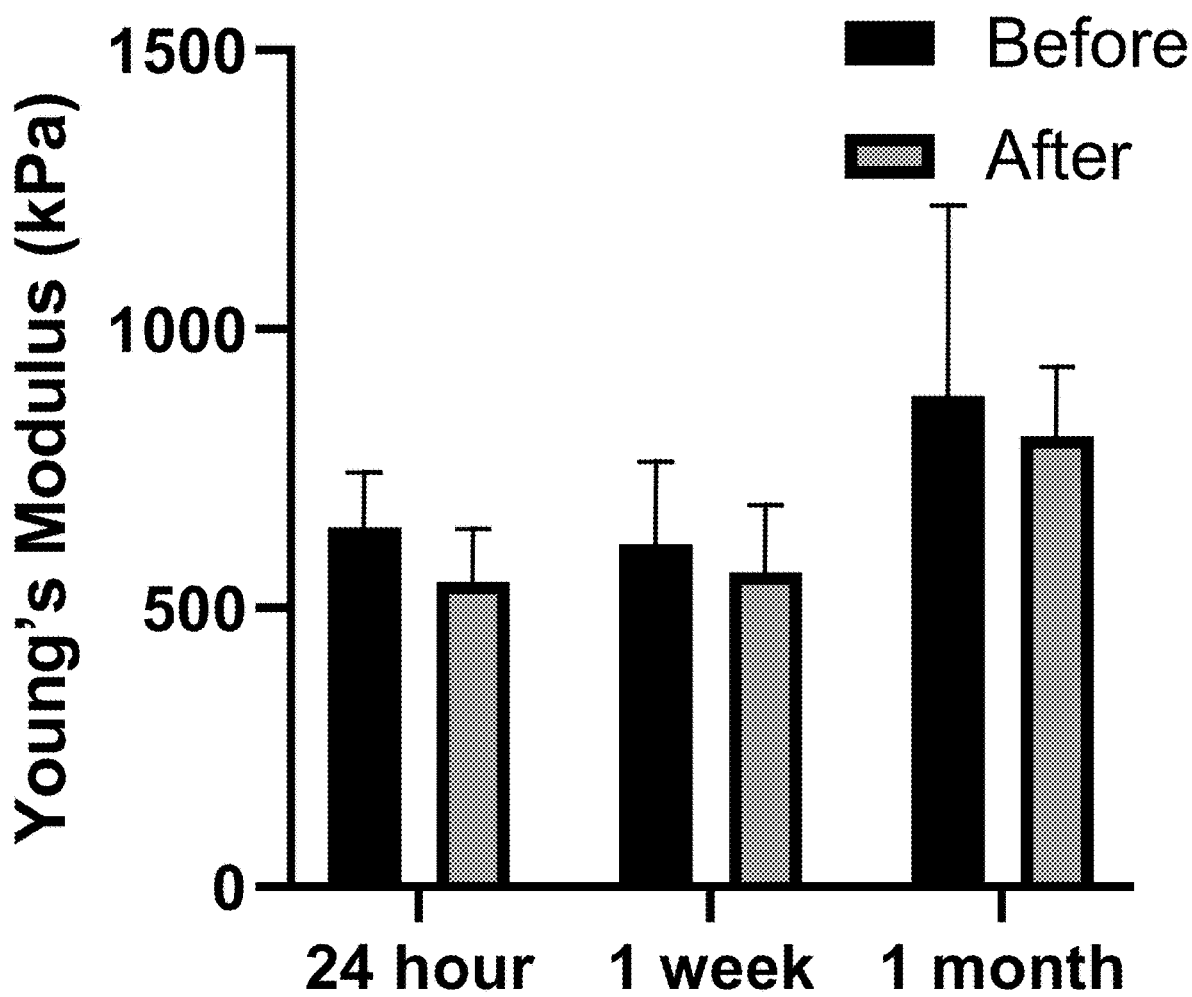
Figure 1H:
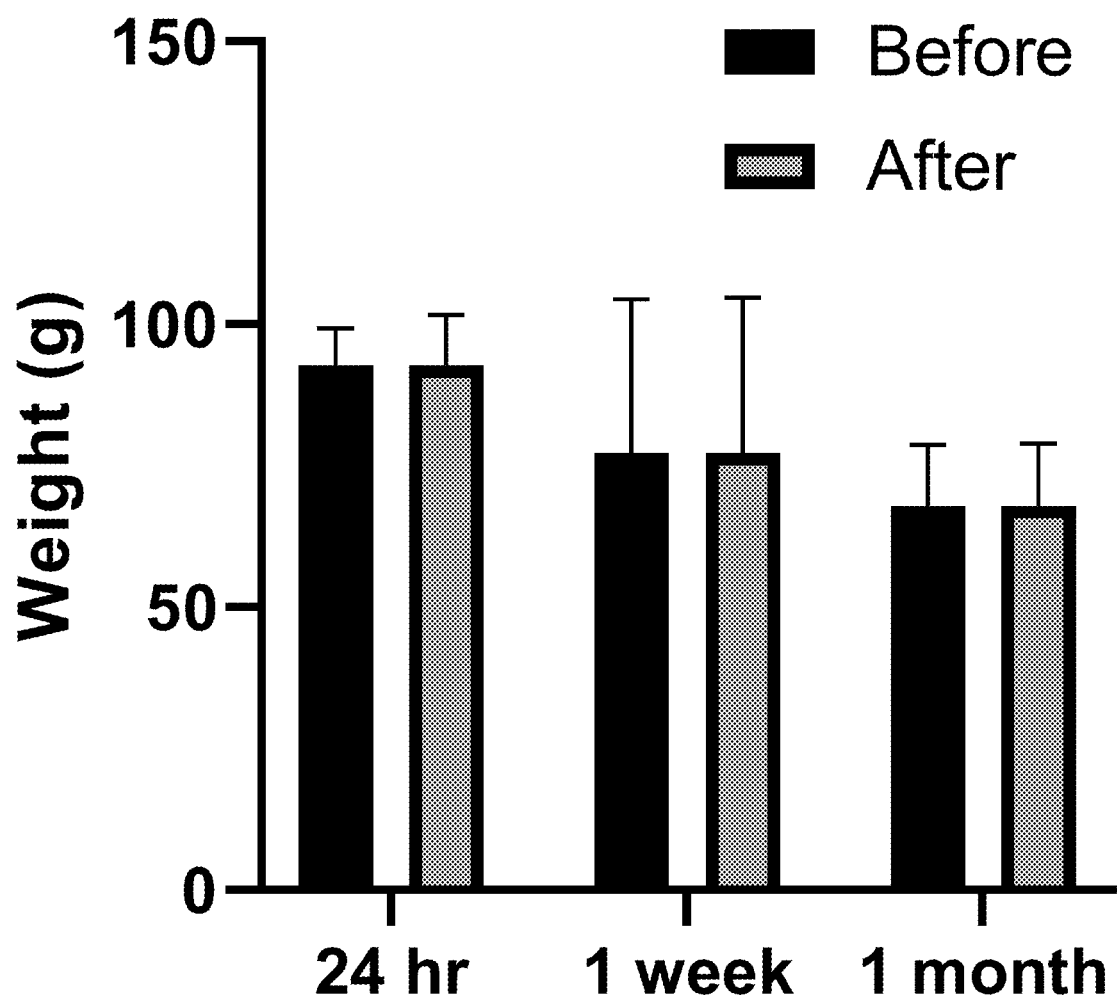
FIG. 1H shows weight change of an example nanocomposite film before and after immersing in culture media for 24 h, 72 h, 1 week and one month.
Figure 1I:
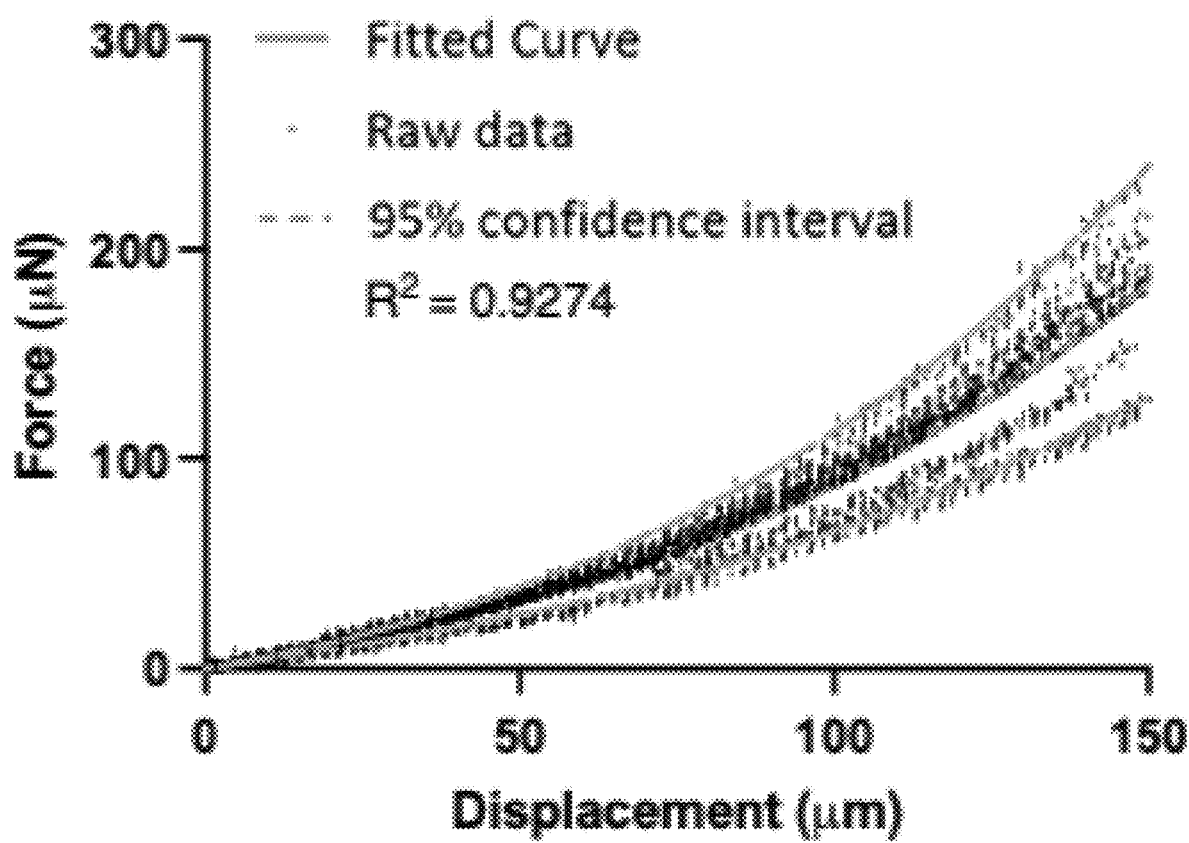
FIGS. 1I-K show force-displacement curves of TPE/QD nanocomposite wires, in an example of the present disclosure, measured by microscale mechanical testing using (I) 500 μm, (J) 700 μm, and (K) 800 μm diameter probes, green line shows the fitted curves and red dashed lines represent 95% confidence interval curves, and $R^2$ values calculated with Prism 9.0.
Figure 1J:
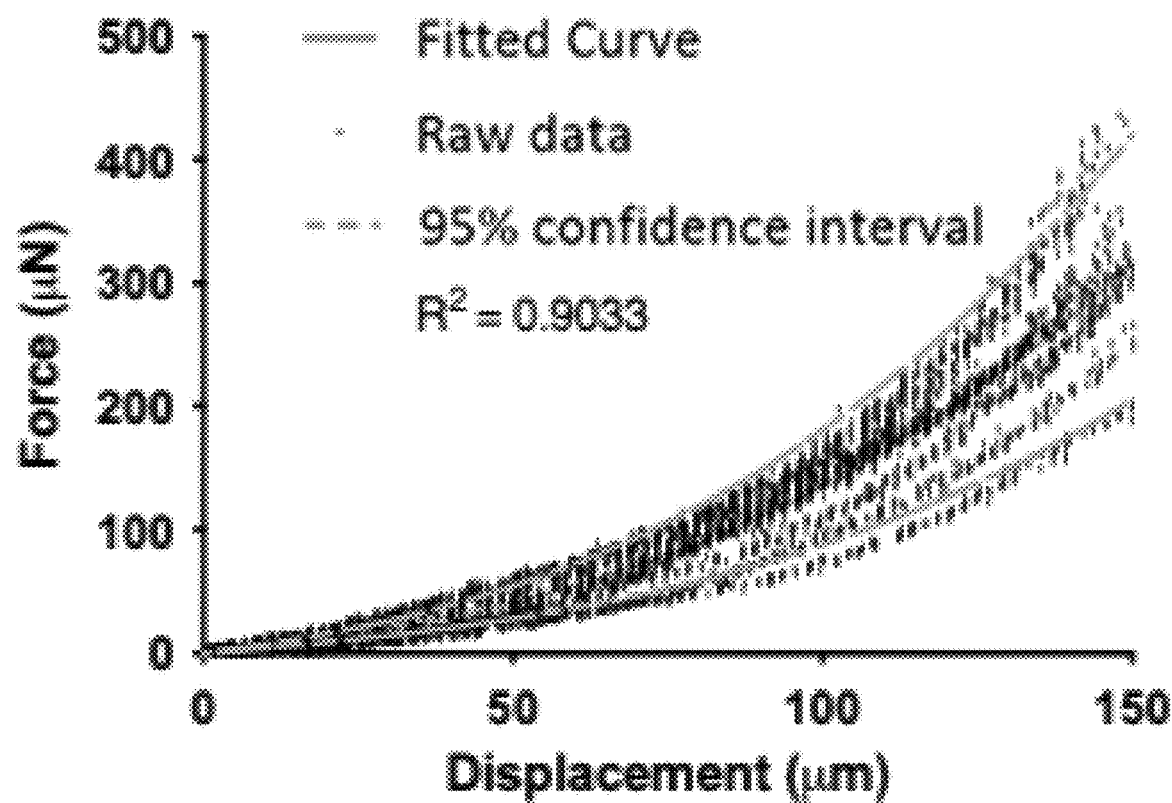
Figure 1K:
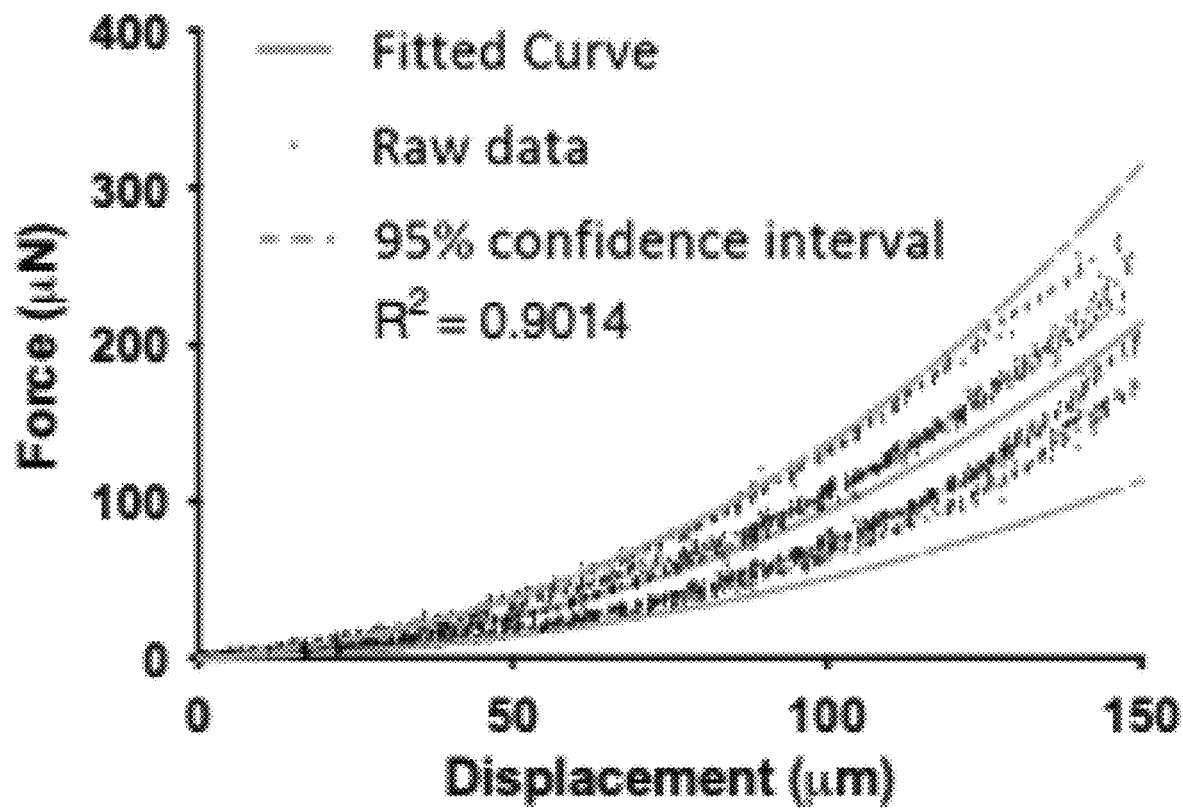

The bulk elastic properties of QD/TPE nanocomposite were characterized for stability in the cell culture medium. FIG. 1F shows unaltered stress-strain curves of the QD/TPE nanocomposite films after immersion in culture media for over one month. The Young's Modulus of the nanocomposite was stable after 24 hr, one-week and one-month immersion in culture media (see FIG. 1G). Additionally, no degradation was observed after immersion of nanocomposite films in culture media for up to one month change (see FIG. 1H). The microwires in the plate device were used as force sensors to monitor contractile behavior of the cardiac tissues. The force-displacement curves were measured by different probes (500 µm, 700 µm and 800 µm) for calibrating wire deformations into contractile force of cardiac tissues. To assess the contractile behavior of the tissues, fluorescent videos of TPE/QD nanocomposite wire displacement during contraction were recorded with red light illumination ($\lambda_{ex}$560 nm/$\lambda_{em}$600 nm) and processed using a customized MATLAB code and calibration curves (see FIGS. 1I-K).

Figure 2A:
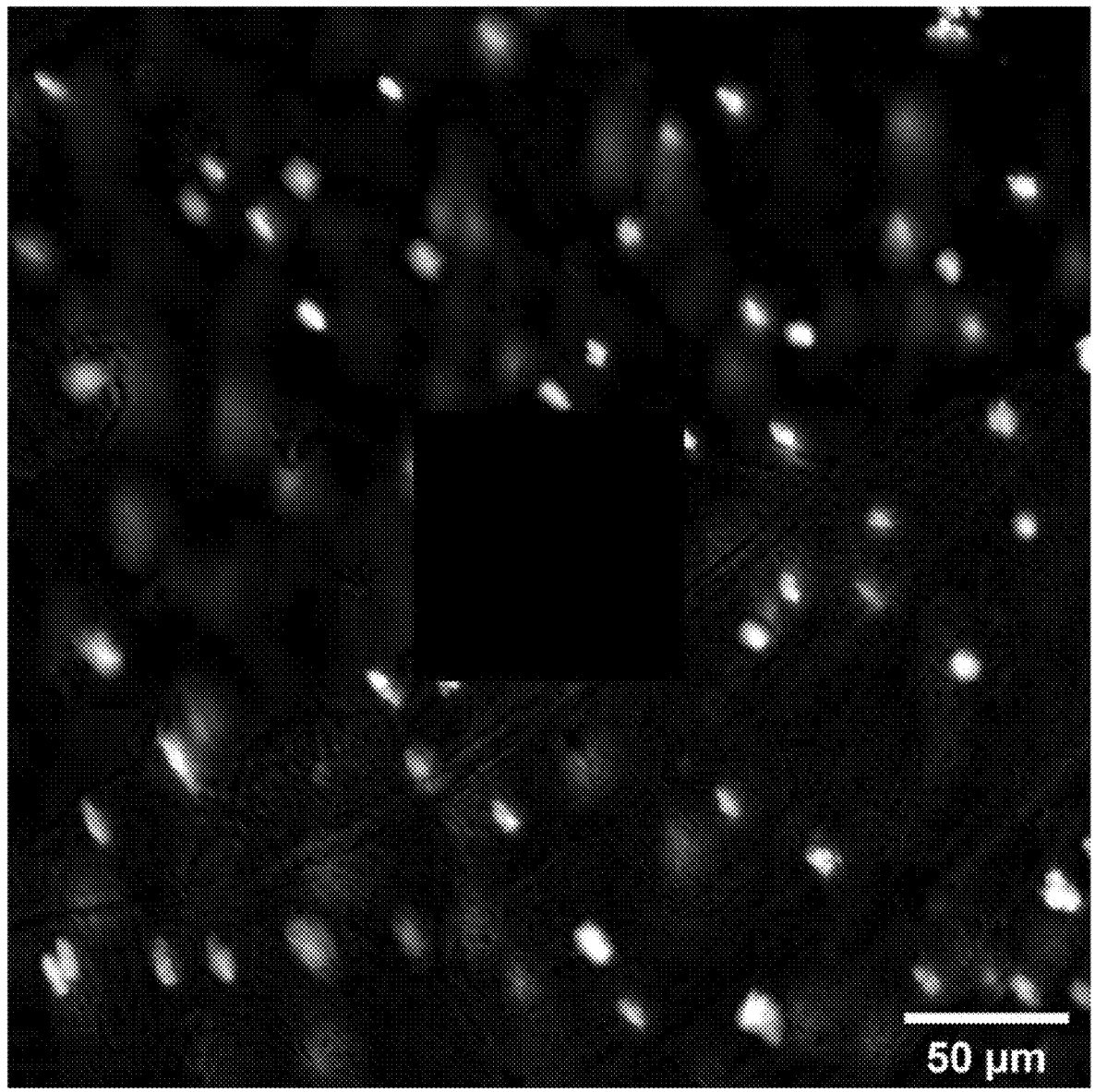
FIG. 2A shows fluorescent microscopy of TPE/QD nanocomposite thin film (~400 μm thickness), in an example of the present disclosure, to show well-dispersed quantum dots.
Figure 2B:
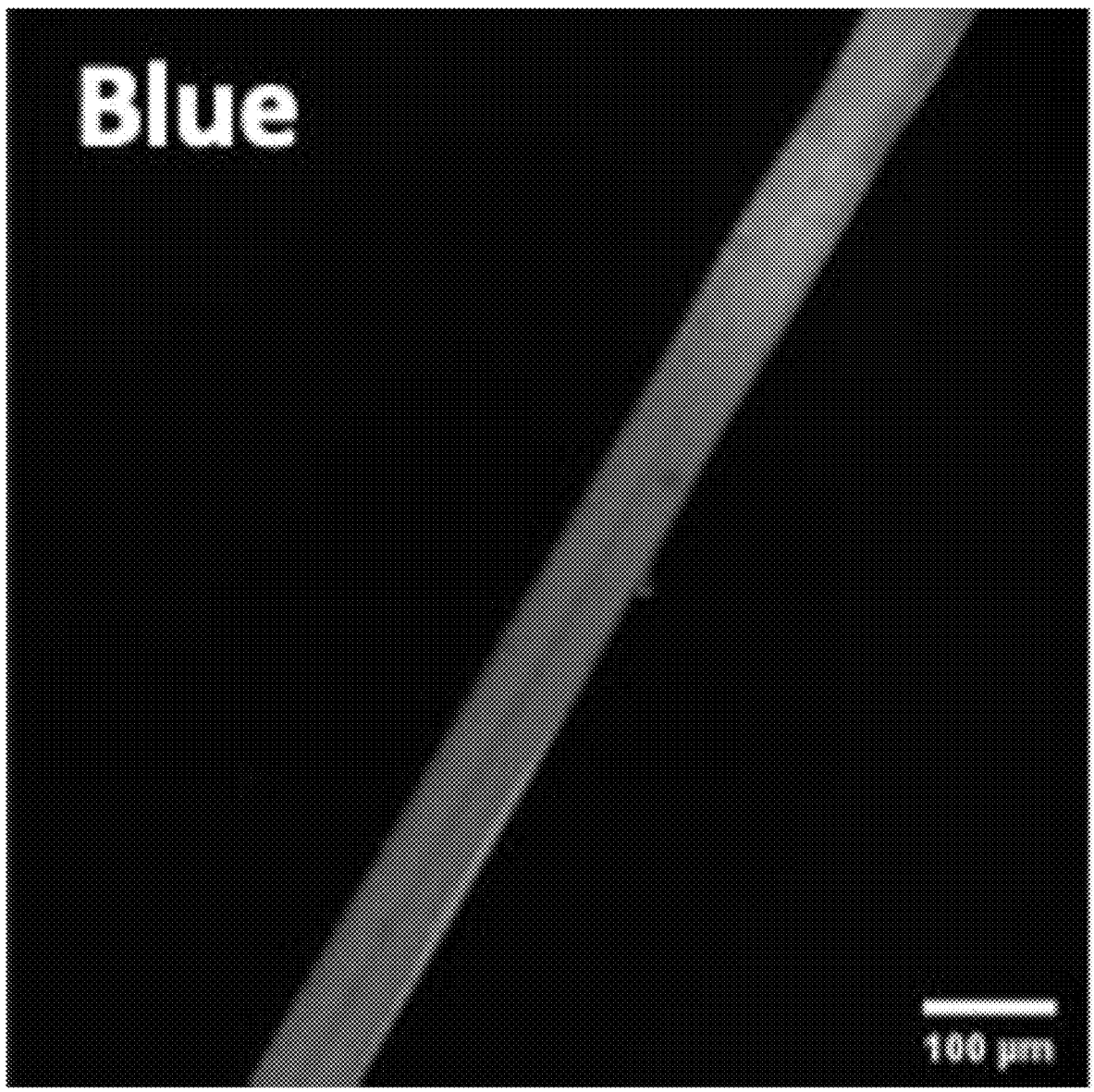
FIG. 2B shows fluorescence microscopy of the nanocomposite wire (using QD, fluorescence $\lambda_{em}$ 450 nm), in an example of the present disclosure, under a blue channel.
Figure 2C:
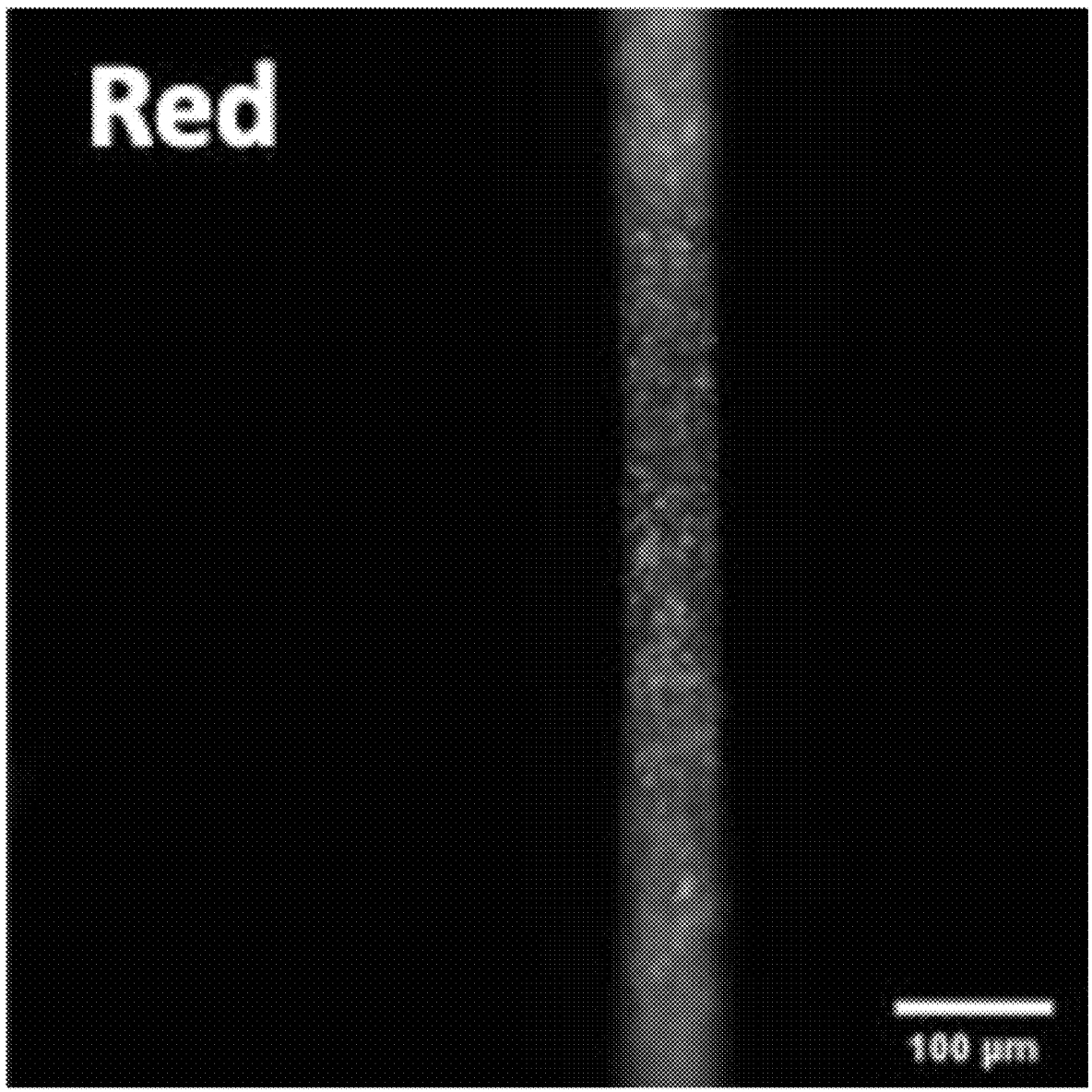
FIG. 2C shows the nanocomposite wire (using QD, fluorescence $\lambda_{em}$ 630 nm), in an example of the present disclosure, under a Texas Red channel.
Figure 2D:
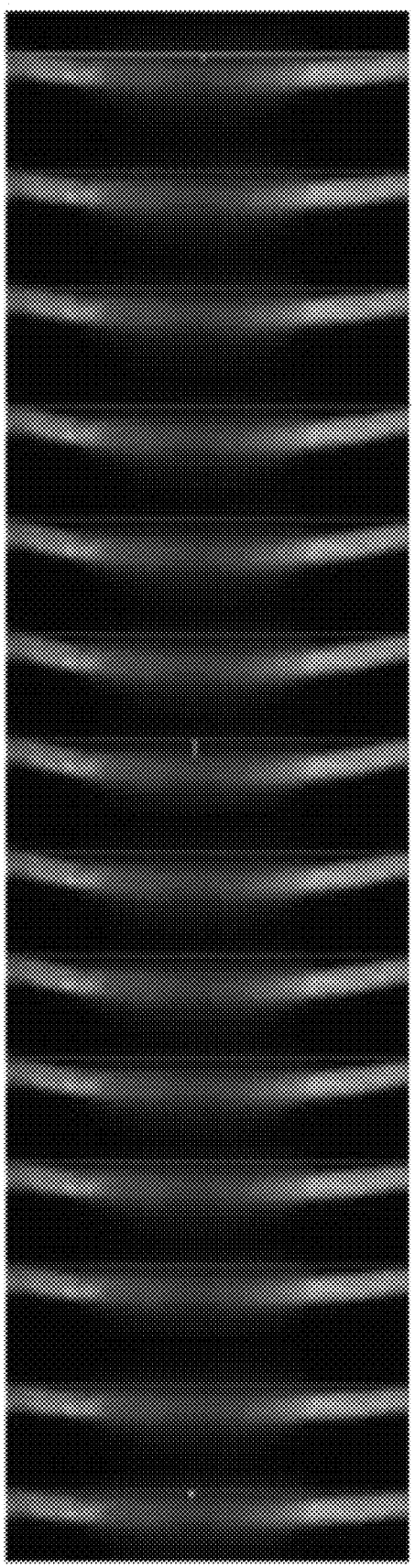
FIG. 2D shows time lapse images of TPE/QD wire displacement by tissue contraction, in an example of the present disclosure, paced at 1 Hz. Scale bar, 400 μm. Wire bending due to passive tension and active force are presented by the green bars.
Figure 2E:
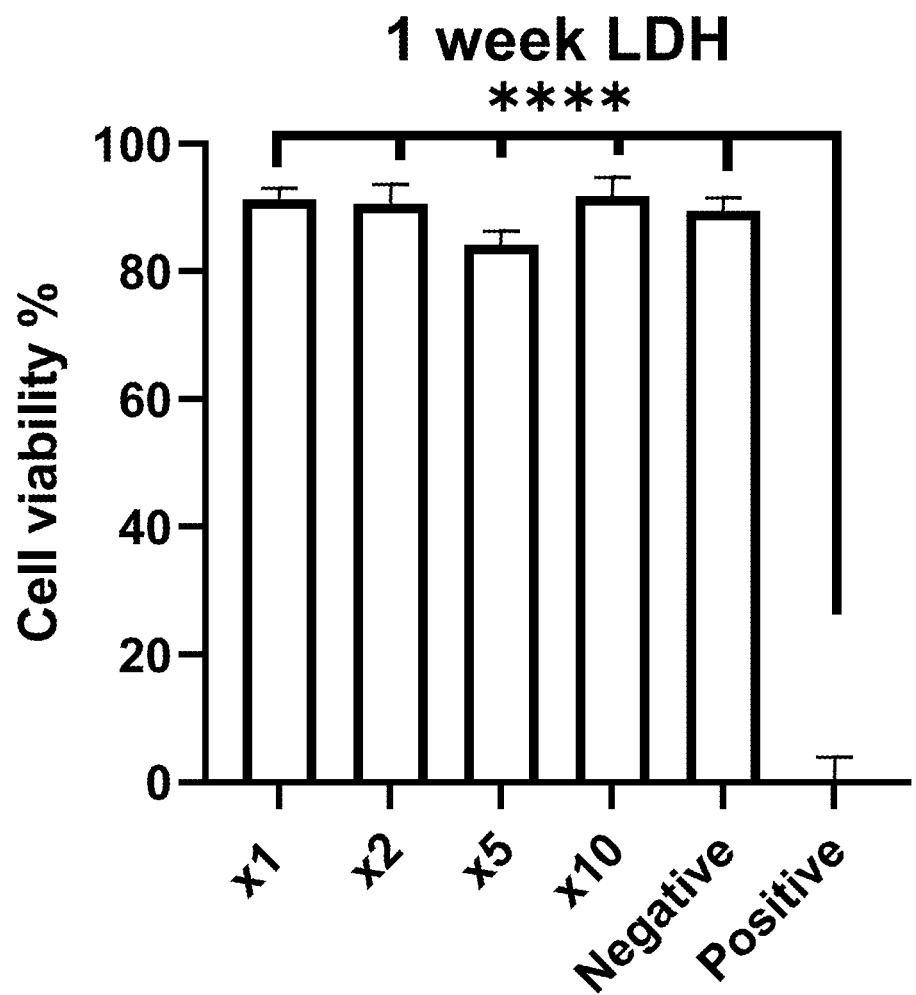
FIG. 2E shows lactate dehydrogenase assay on cardiac fibroblasts cultured for 24 hours in dilutions of culture media exposed to the nanocomposite for one week, in an example of the present disclosure.
Figure 2F:
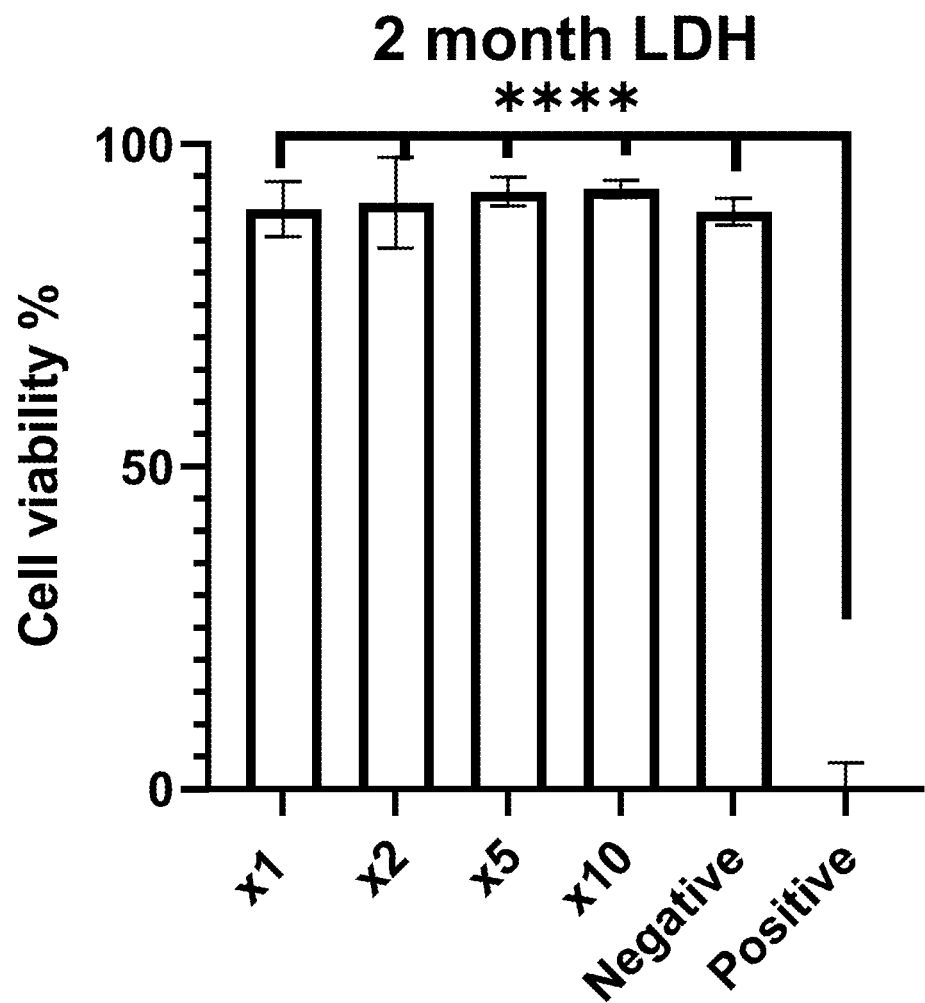
FIG. 2F shows lactate dehydrogenase assay on cardiac fibroblasts cultured for 24 hours in dilutions of culture media exposed to the nanocomposite for two months, in an example of the present disclosure.
Figure 2G:
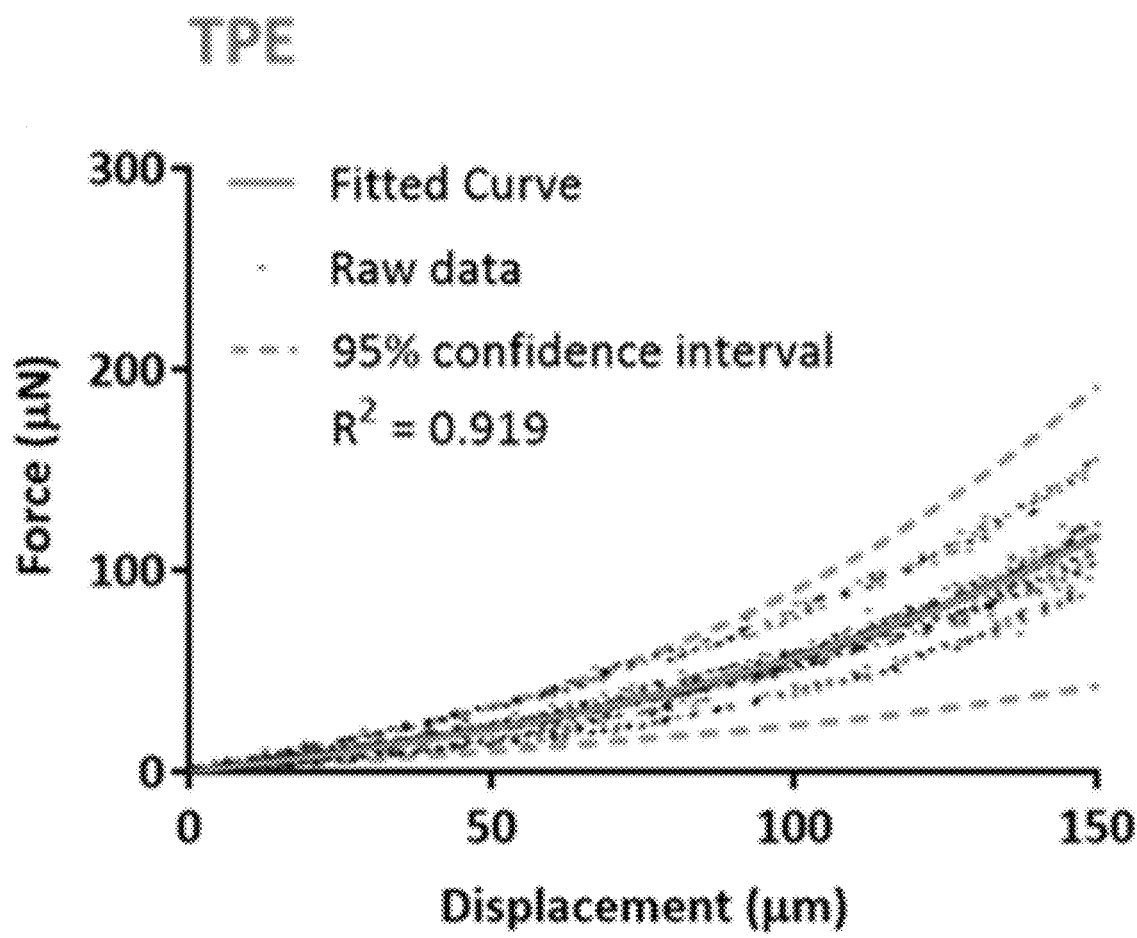
FIG. 2G shows force-displacement curves of TPE wires, in an example of the present disclosure.
Figure 2H:
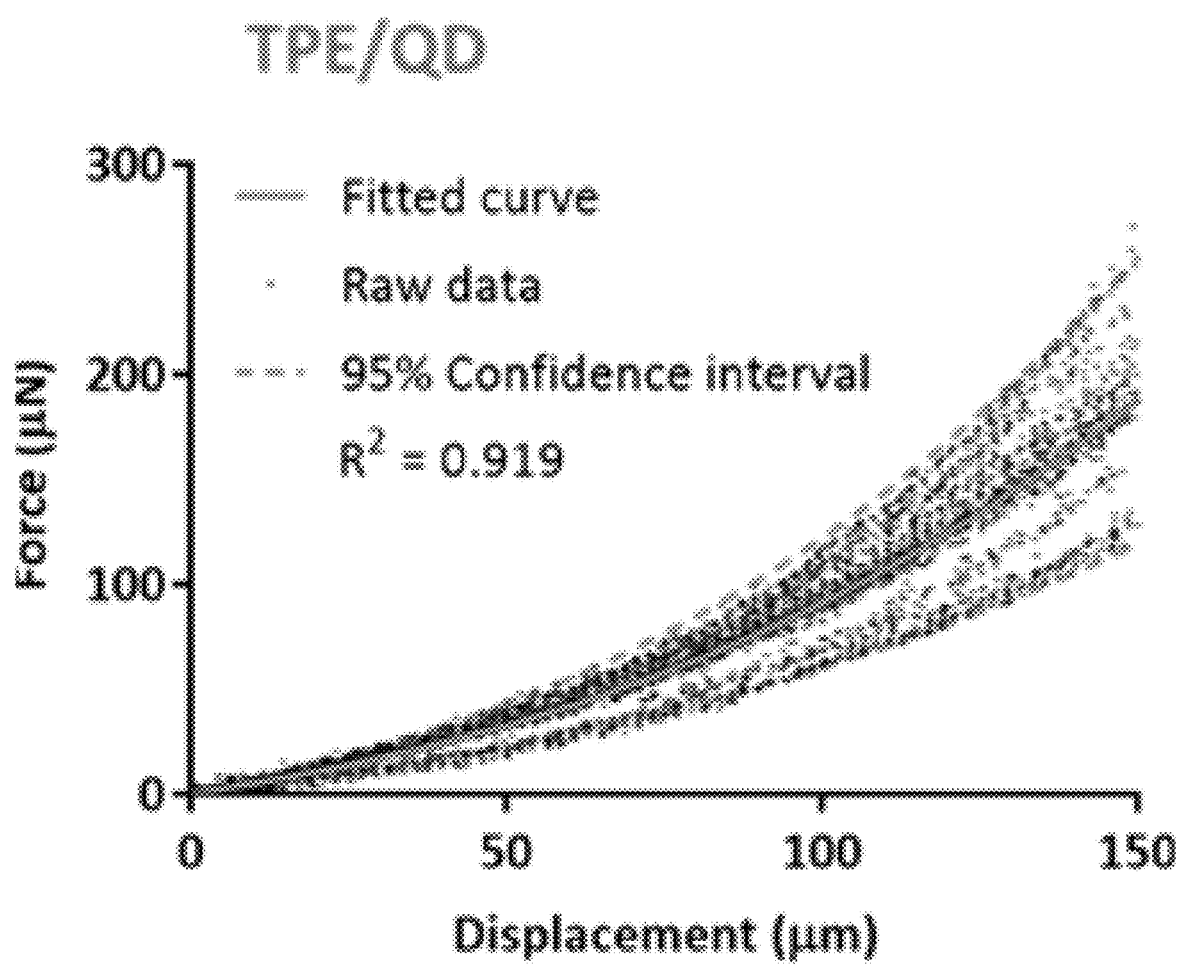
FIG. 2H shows force-displacement curves of TPE/QD nanocomposite wires, in an example of the present disclosure, before incubation.
Figure 2I:
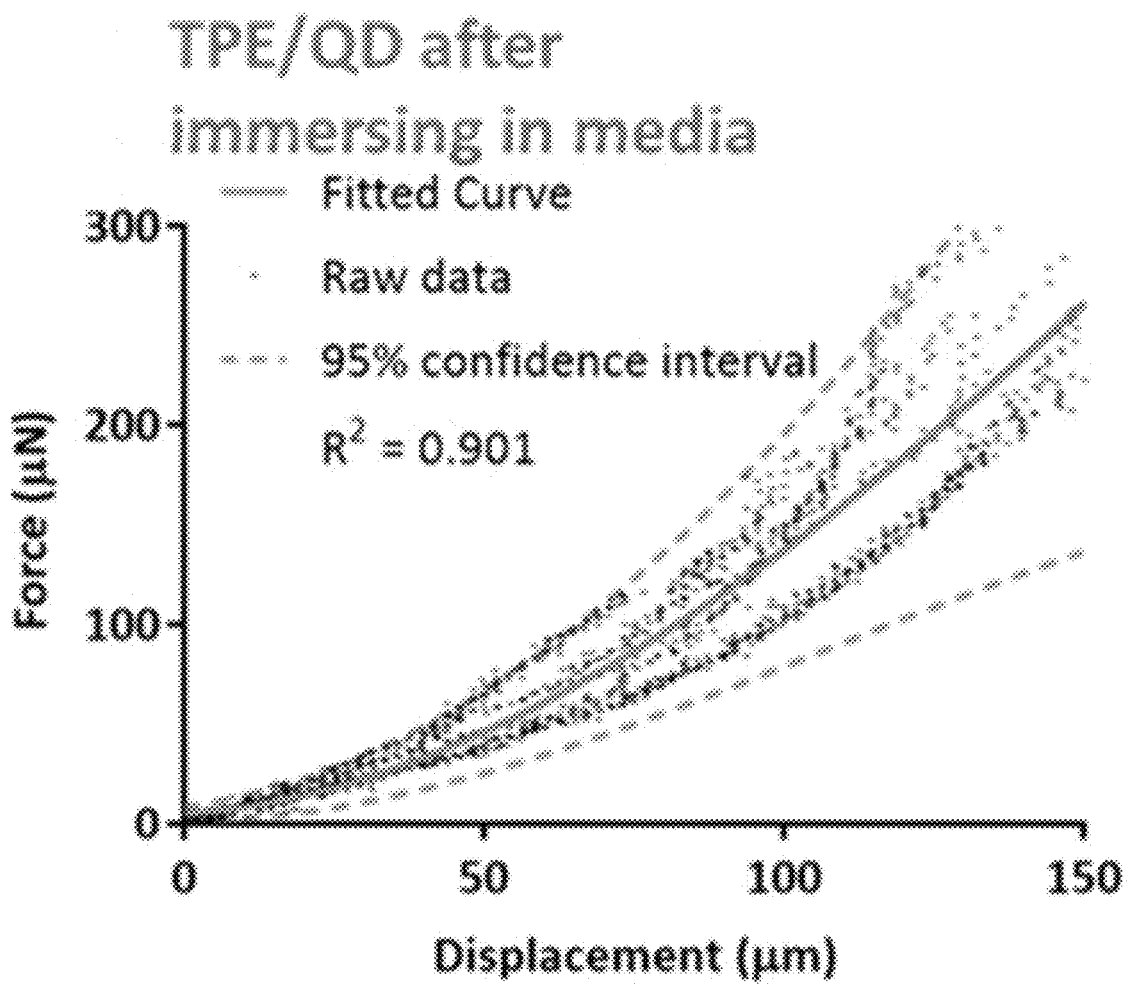
FIG. 2I shows force-displacement curves of TPE/QD nanocomposite wires, in an example of the present disclosure, after 6-week media incubation.
Figure 2J:
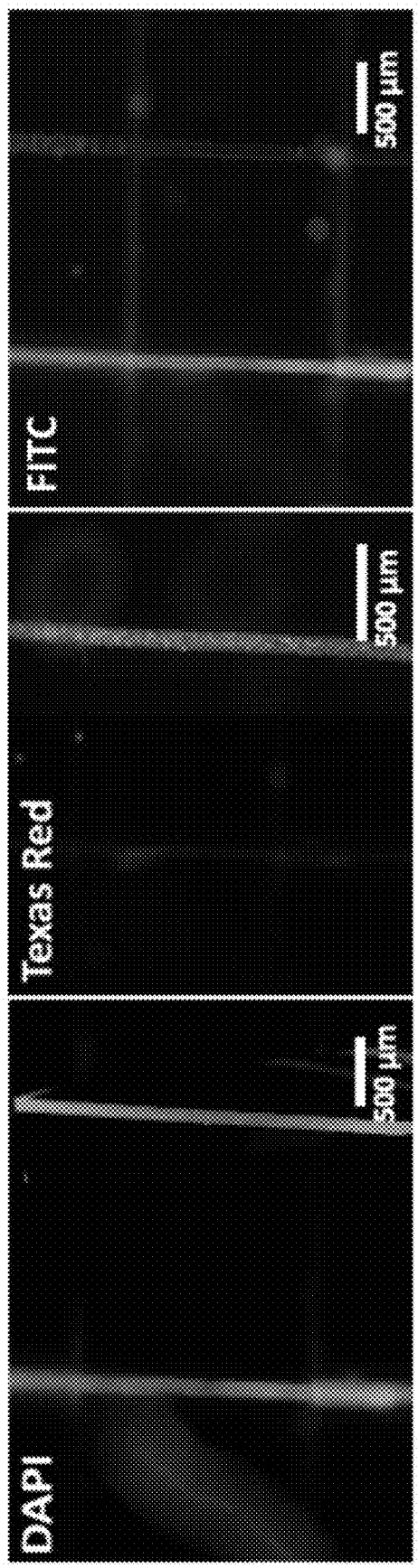
FIG. 2J shows autofluorescence of PoMaC (left) and TPE/QD (right) wires, in an example of the present disclosure, under different channels (DAPI, Texas Red and FITC)
Figure 2K:
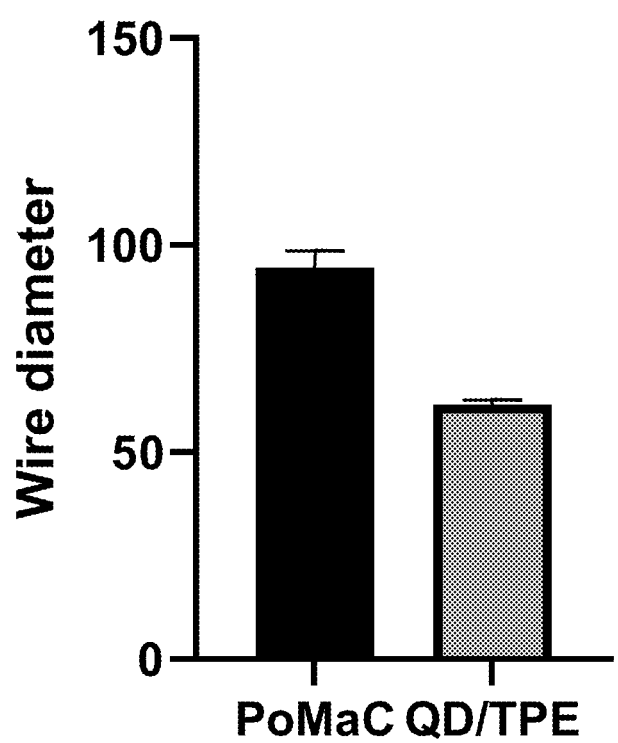
FIG. 2K shows the different diameter of PoMaC and TPE/QD wires used for tissue formation, in an example of the present disclosure.

TPE/QD nanocomposite were prepared by using different QDs to generate structures of various colors for biomedical applications. Different QDs (fluorescence $\lambda_{em}$ 450 nm and 630 nm) were dissolved in toluene to generate nanocomposites. Well-dispersed nanocomposite was formed after solvent evaporation (see FIG. 2A). Nanocomposite wires were presented different colors (blue and red) under fluorescent microscope (see FIGS. 2B and 2C). Fluorescence imaging of the nanocomposite wires during tissue recording under electrical pacing (see FIG. 2D) showed the wires were typically bent somewhat at baseline, which was used to monitor contractile properties of cardiac tissues (e.g., passive tension and active force). No cytotoxicity was further confirmed by cultivating cardiac fibroblasts in dilutions of culture media obtained after one week and one month incubation with the nanocomposites (see FIGS. 2E and 2F). The force-displacement curves of 3D printed TPE and QD/TPE microwires were also assessed, showing that QD/TPE microwires were slightly stiffer than TPE microwires due to the addition of a very low amount of QD nanoparticles (0.05%) (see FIGS. 2G and 2H). The microwires in the plate device were used as force sensors to monitor contractile behavior of the cardiac tissues in the plate device, thus it was necessary to confirm stability of the force/displacement curves before and after 6-week of cardiac cell cultivation (see FIG. 2I). The fluorescence of PoMaC wires used in Biowire II and those of TPE/QD wires under different channels (see FIG. 2J) and the wire diameters (see FIG. 2K) used to form biowires was compared, showing uniform fluorescence of both wires.

In the present application, very low concentration of 0.05% TPE/QD composite was used to form microwires in the heart-on-chip devices, which had excellent autofluorescence for tracking contractile properties of cardiac tissues. The use of a very low concentration of the fluorophore for applications performed in solution, since a low concentration of the fluorophore makes the nanocomposite much less prone to self-quenching and spectral changes.

Fabrication of Multiwell Plate Device Compared with Biowire II

Figure 3A:
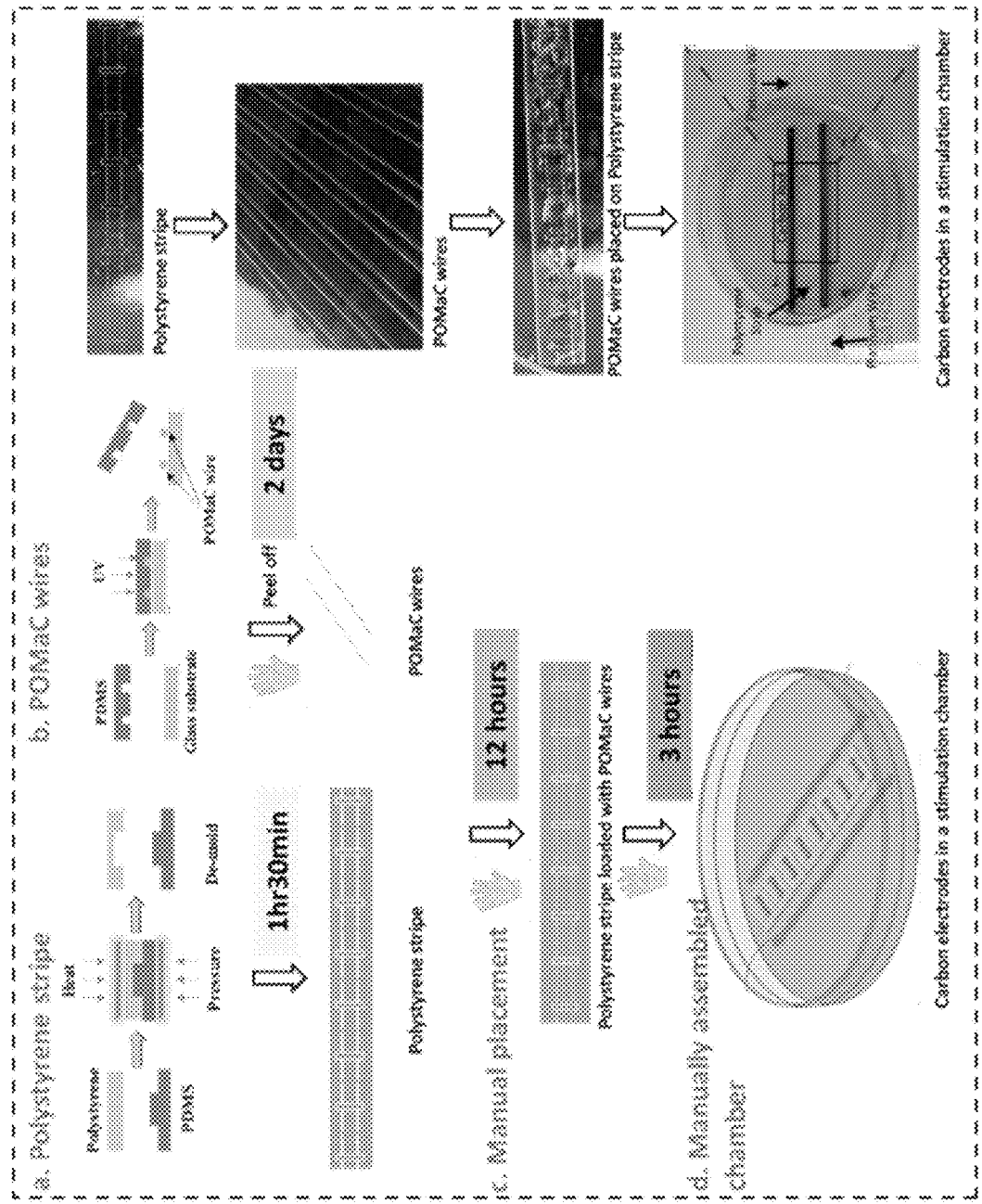
FIG. 3A shows fabrication of an example Biowire II multiwall plate, in an example of the present disclosure.
Figure 3B:
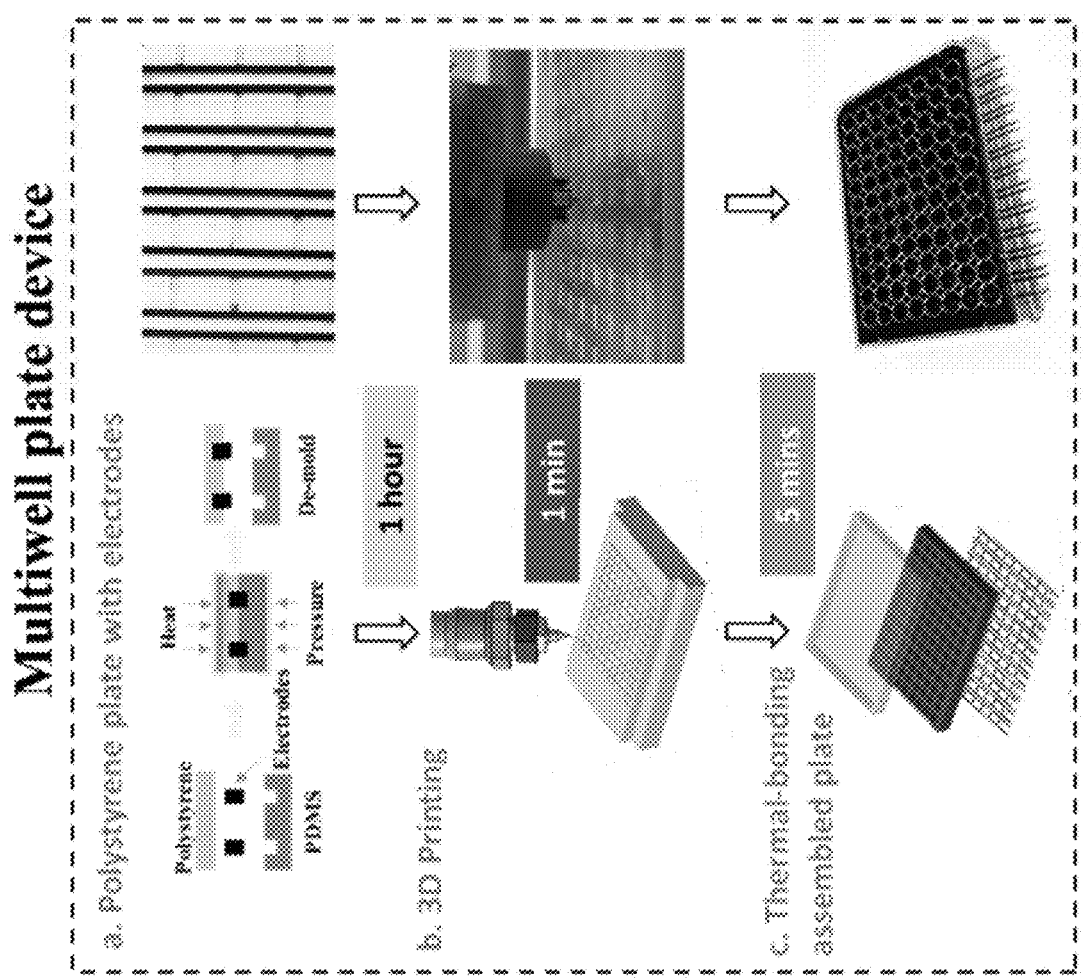
FIG. 3B shows fabrication of a multiwell plate device according to an example of the present disclosure.
Figure 3C:
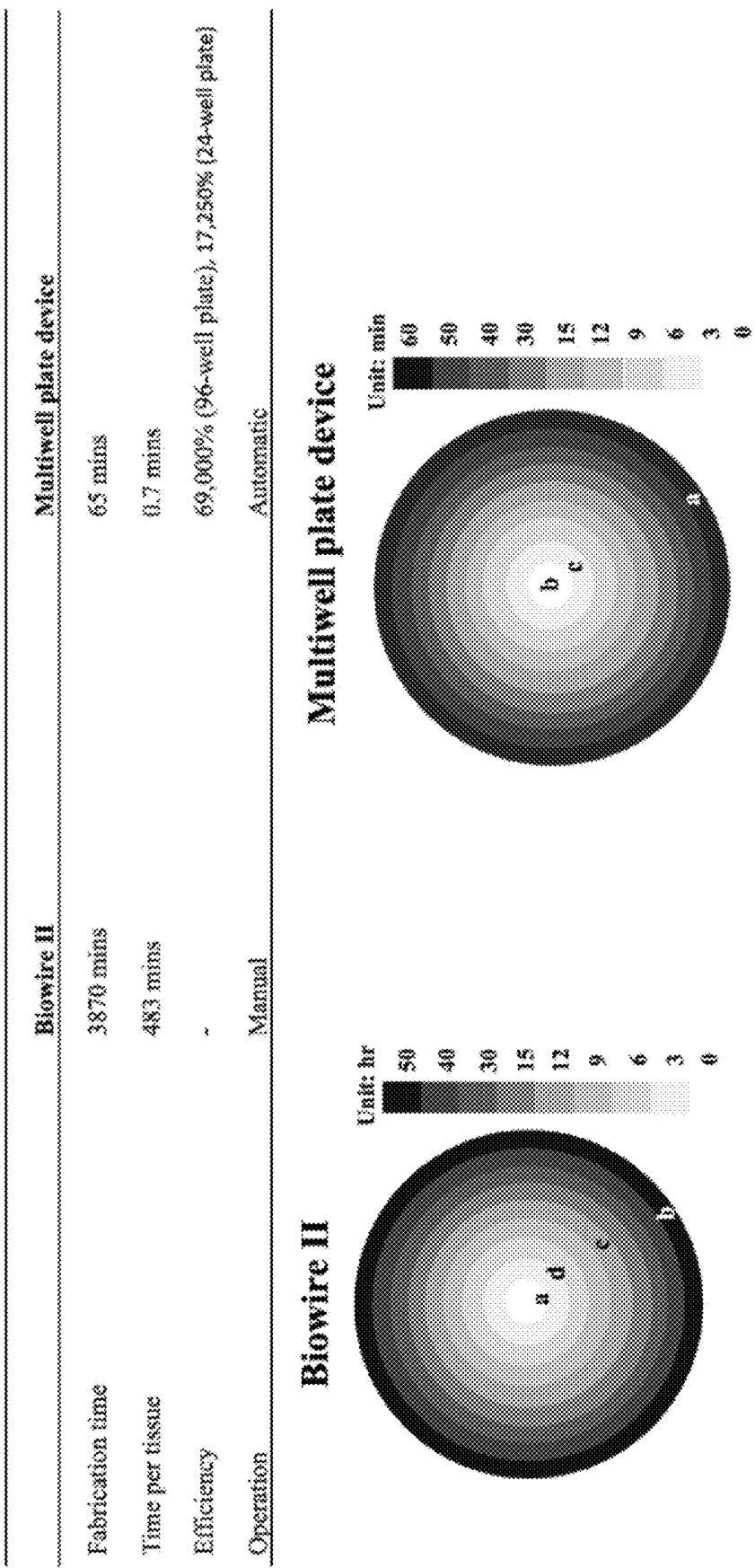
FIG. 3C shows a comparison of the fabrication of the Biowire II multiwall plate of FIG. 3A with the fabrication of the multiwell plate device of FIG. 3B.

A combination of microfluidic technology and a 3D printing technique was used to fabricate this heart-on-a-chip platform. Compared with Biowire II, this will enable us to move from a plastic chip to a plastic 24-well or 96-well plate for cultivation of Biowires. FIGS. 3A to 3C show detailed fabrication processes and fabrication times for each step for generating Biowire II and multiwell plate devices. Currently, available Biowire II devices, are hand-made by hot-embossing and 3D stamping. They can be considered "artisan" devices, where a skilled researcher makes each device by hand at a production throughput of 2-3 devices per day. This approach cannot meet current industry demand. The present fabrication strategy enables us to reach the manufacturing throughput of 100s per day, by automating production, while improving consistency and the number of tissues that can be grown in each device.

Through this fabrication process, Biowire II platform can be scaled up from an 8-microwell chip to a patterned 24-well or 96-well plate. The scale-up was achieved by the integration of three classes of materials in the platform, within 127×85 $mm^2$, footprint of a 96 well plate. The present approach helps to enable speeding up of platform production by 17,250%.

Multiwell Device Plate Characterization and 3D Cardiac Tissue Formation

Figure 4A:
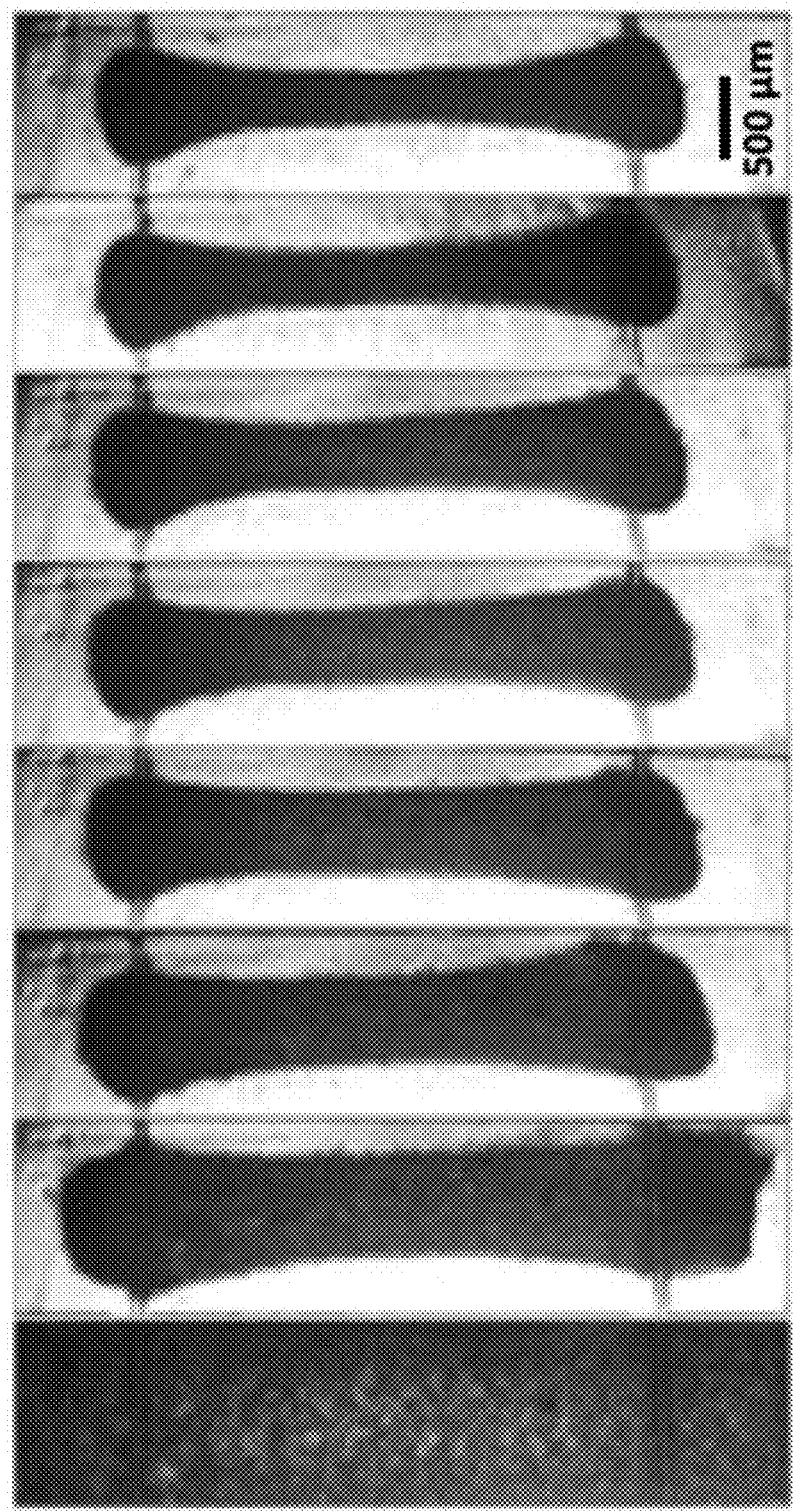
FIG. 4A shows daily representative tissue images (n=3) after seeding seven days, in an example of the present disclosure.
Figure 4B:
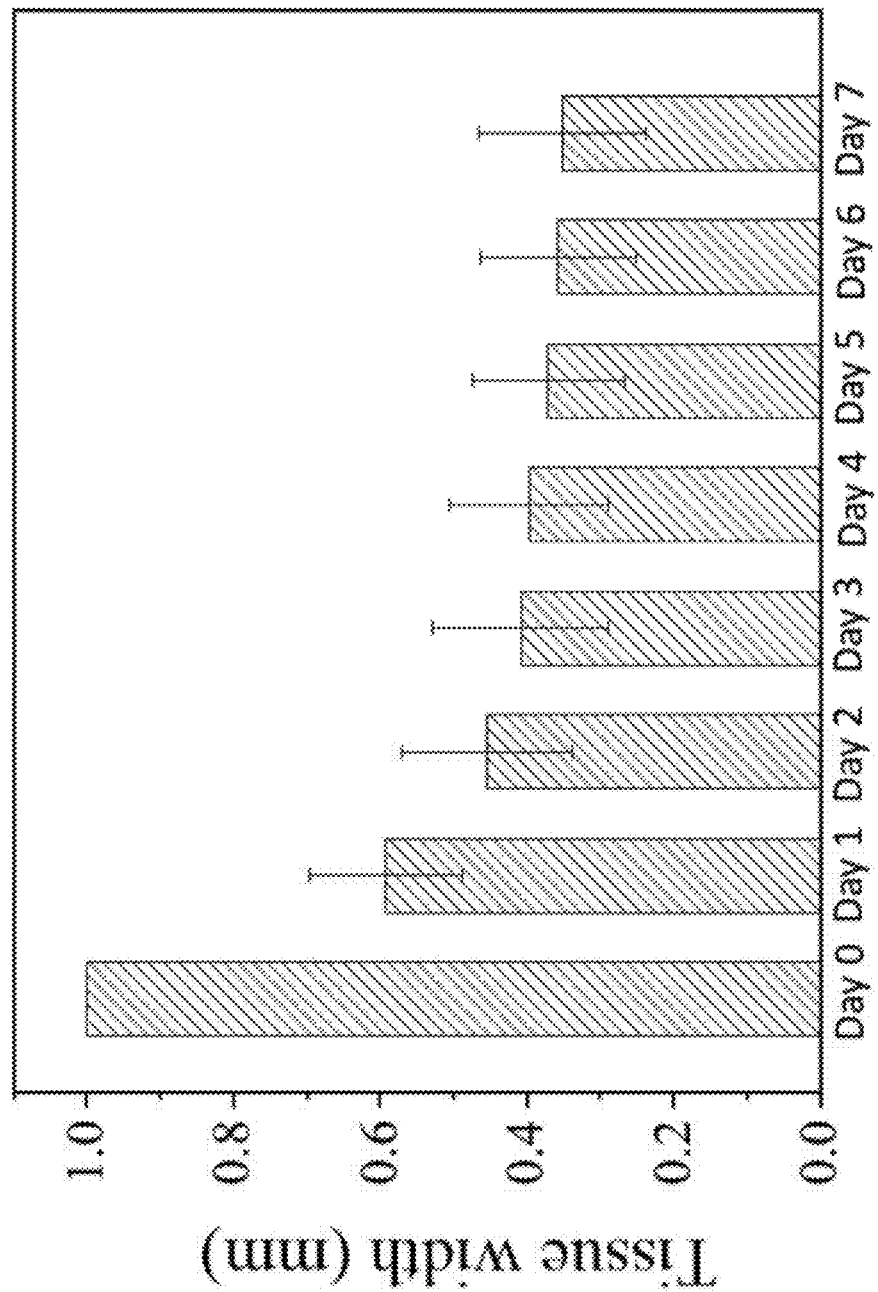
FIG. 4B shows the change of tissue diameter during the seeding of the seven days of FIG. 4A.

To demonstrate the utility of the platform, human iPSC derived cardiomyocytes and human cardiac fibroblasts (at a 10:1 ratio) were cocultured with hydrogel in the 24-well plate device connected with an electrical stimulator. Seeded cells compacted and remodeled to generate 3D cardiac tissues that physically attached to the nanocomposite microwires. FIG. 4A shows optical microscope images of cardiac tissue, demonstrating tissue compaction during the first week after seeding. The diameter of the tissue decreased as a function of the seeding day, with an obvious decrease at the first two days and a slight change after day 3 (see FIG. 4B).

Long-Term Tissue Culture with Electrical Stimulation

Figure 4C:
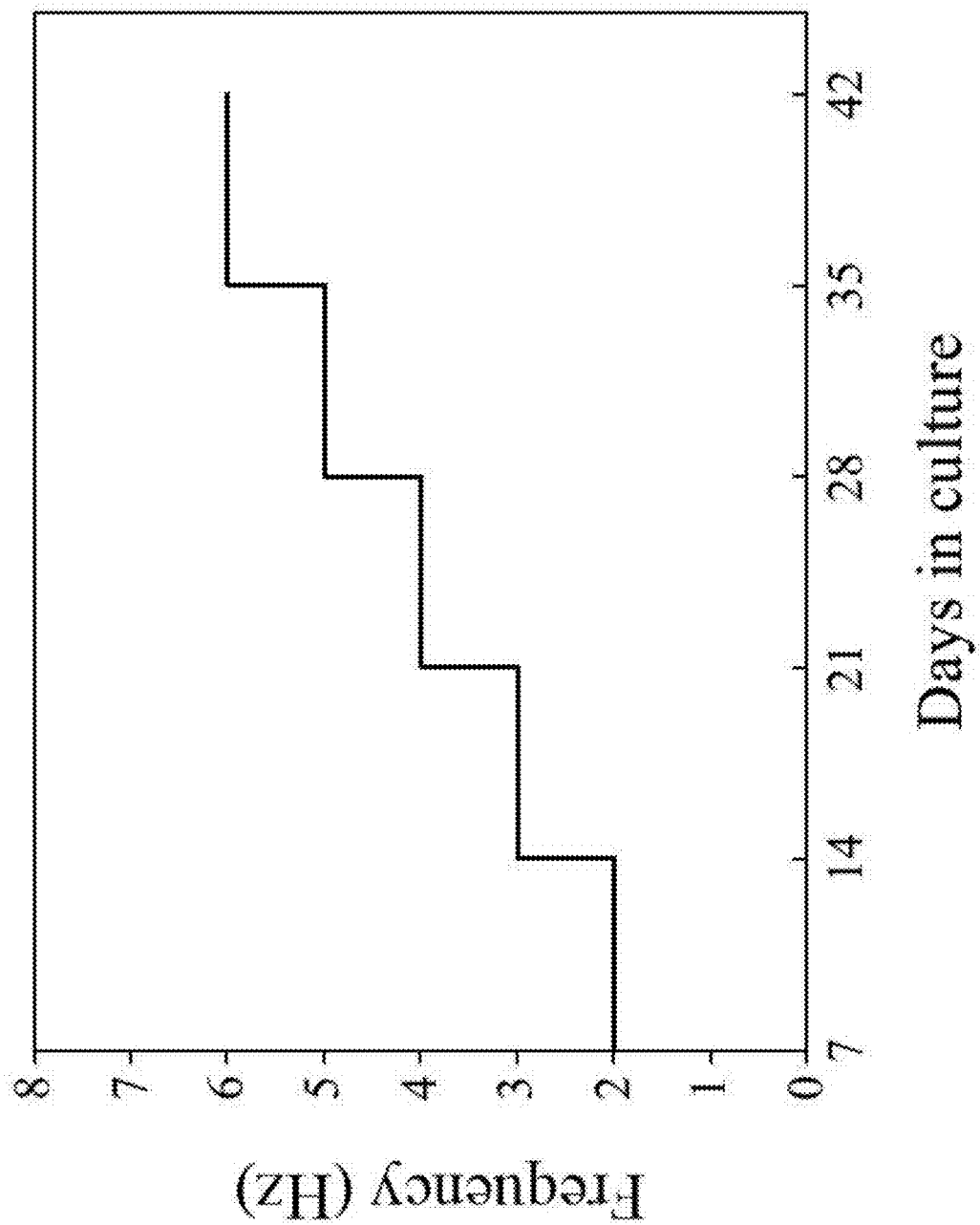
FIG. 4C shows electrical conditioning protocols, in an example of the present disclosure.
Figure 4D:
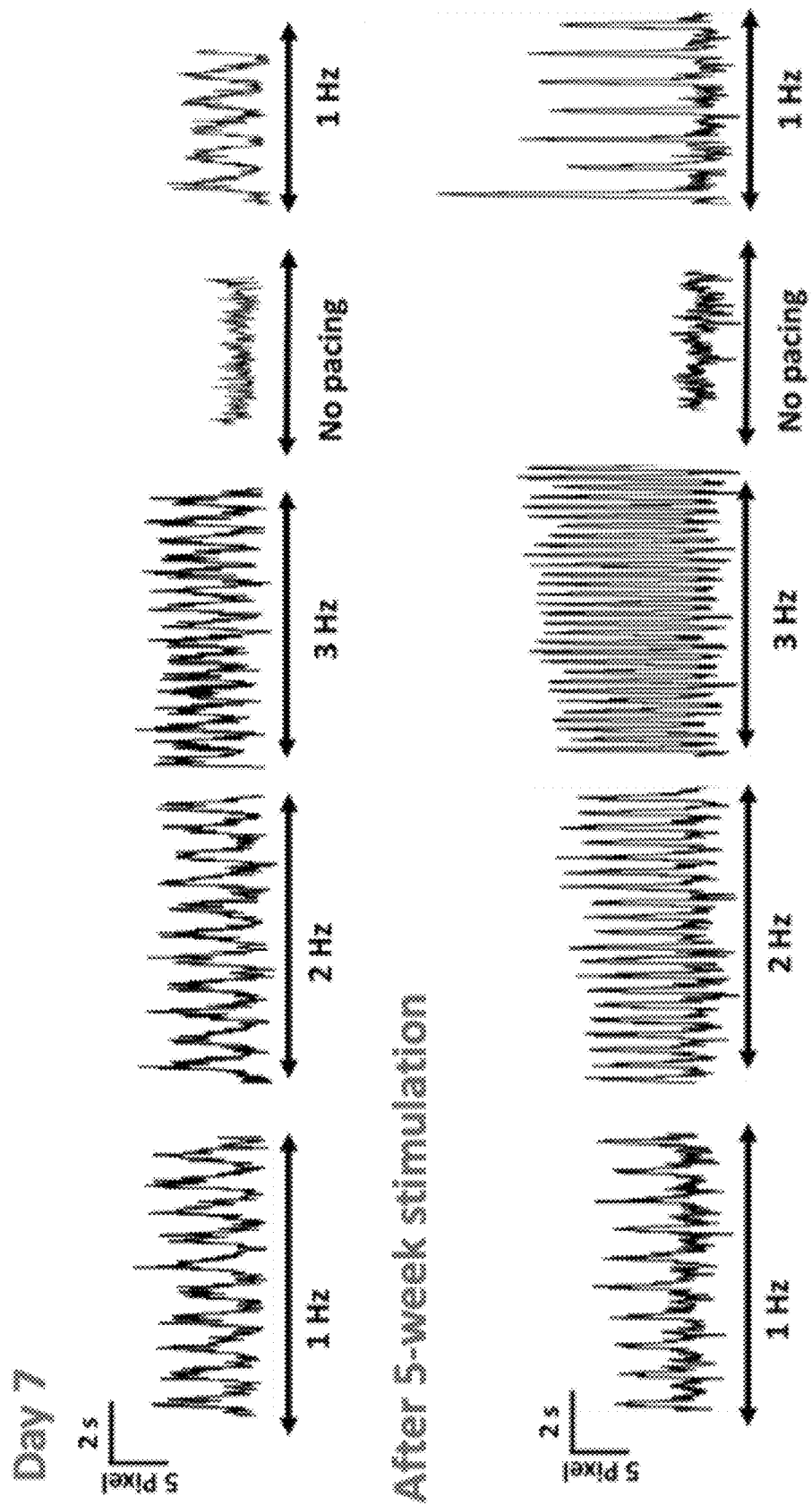
FIG. 4D shows representative force traces of cardiac tissues after seeding seven days and (E) force traces after 5-week electrical stimulation, under different frequency rate, in an example of the present disclosure.
Figure 4E:
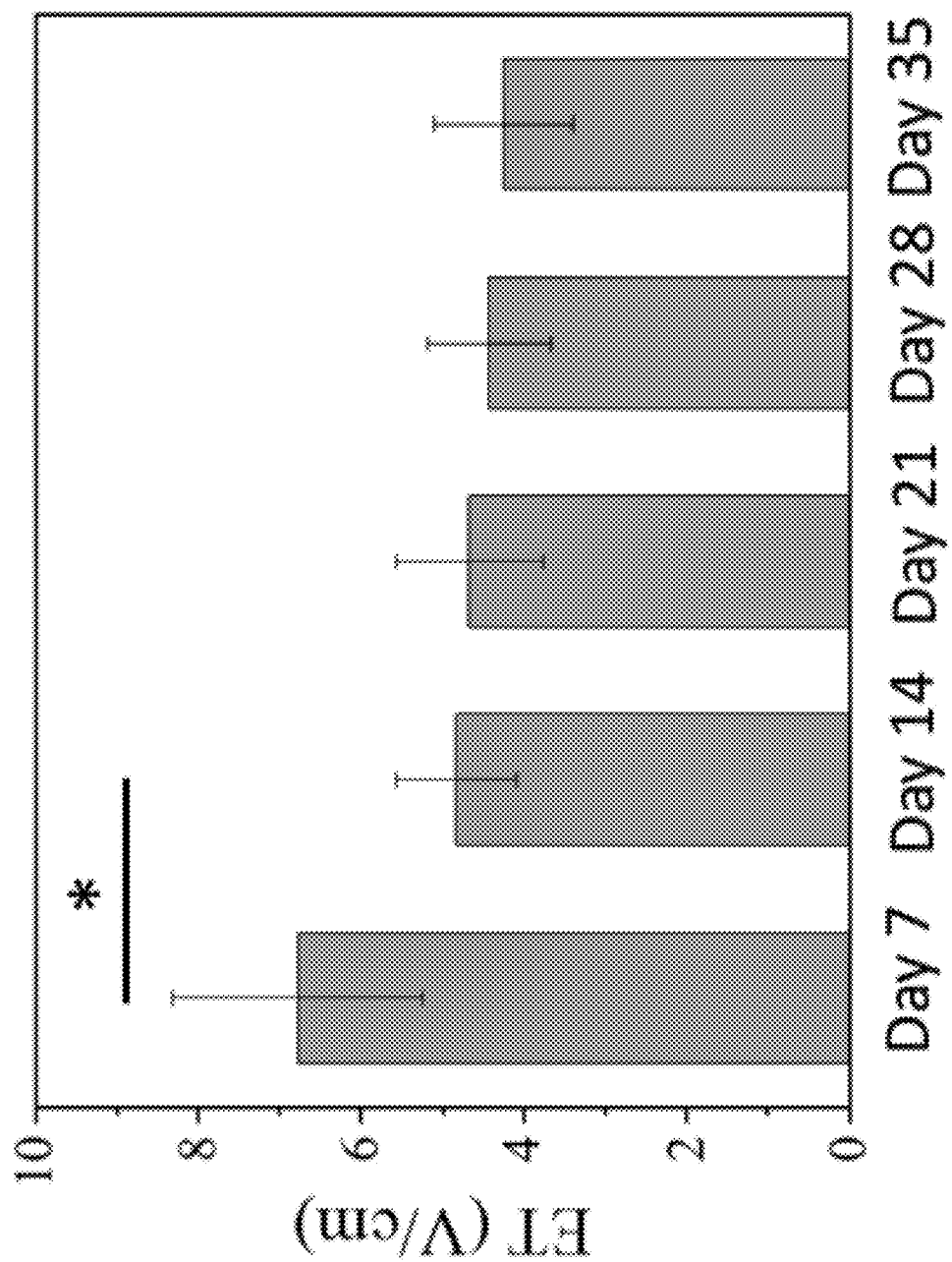
FIG. 4E shows a significant decrease of excitation threshold (ET), in an example of the present disclosure.
Figure 4F:
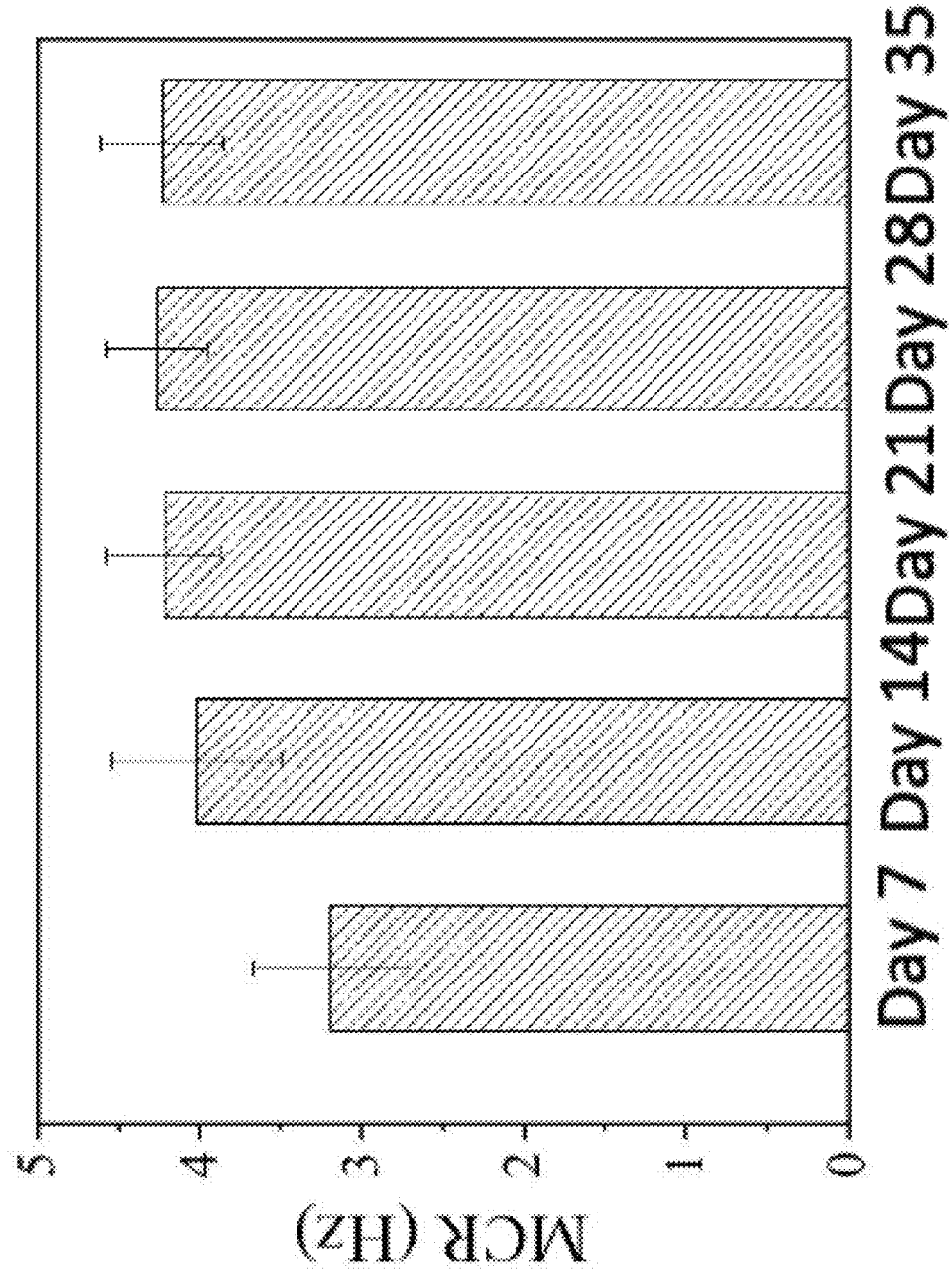
FIG. 4F shows an increase of maximum capture rate (One-way ANOVA analysis, *p<0.05, data are shown as average±s.d., n=4), observed after cell seeding for 7 days and during electrical stimulation, in an example of the present disclosure.
Figure 4G:
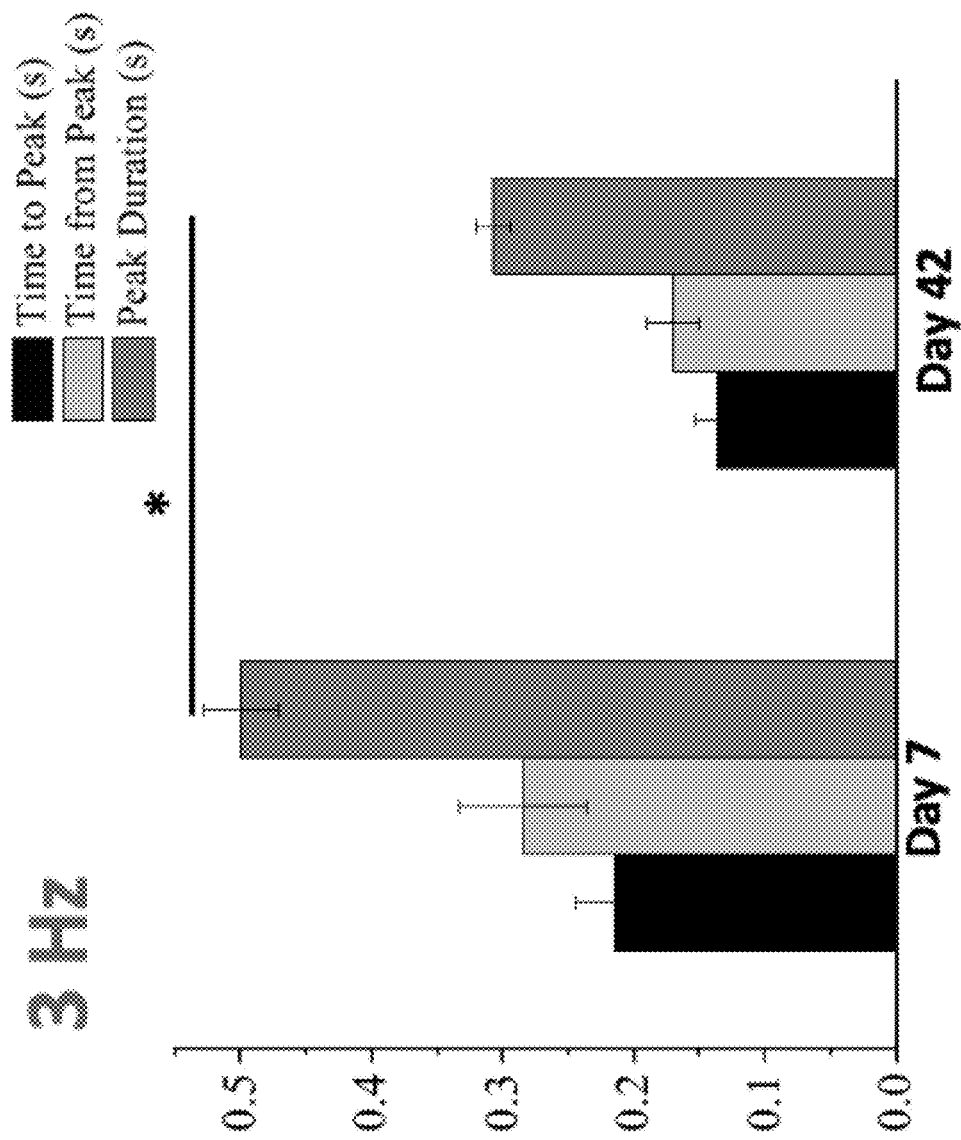
FIG. 4G shows quantification of contraction, relaxation and the total duration time compared between day 7 and day 35 (Student's t-test, *p<0.05, data are shown as average±s.d.), in an example of the present disclosure.
Figure 4H:
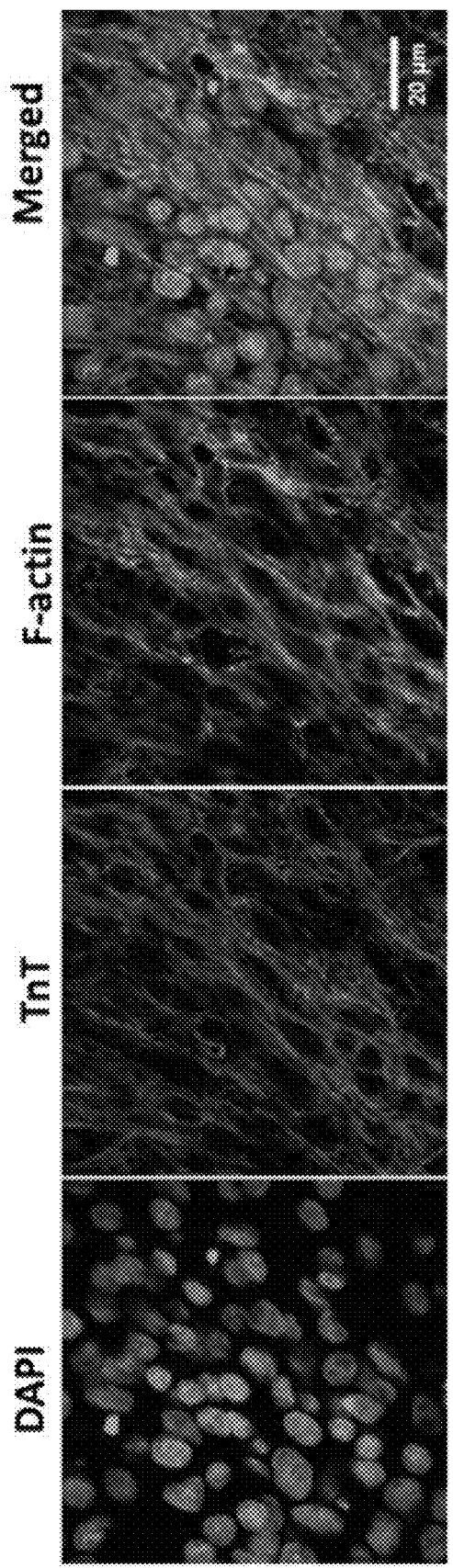
FIG. 4H shows confocal images of cardiac tissue after 5-week incubation, immunostained for DAPI, sarcomeric F-actin and troponin-T, in an example of the present disclosure.

Electrical field stimulation of the cardiac tissue was performed in a 24-well plate device after cell seeding of 7 days. FIG. 4C shows the standard ventricular stimulation protocol. Briefly, tissues were conditioned for five weeks with a weekly increase of 1 Hz in frequency. Functional responses of the engineered cardiac tissues (e.g., contraction time, force measurements, electrical functions) were assessed weekly under electrical stimulation. 3D printed nanocomposite microwires were used as force sensors to monitor the tissue contraction behavior by tracking the fluorescence of the microwires. After 7 days in culture, the tissues presented a relatively flat force-frequency relationship (FFR), without post-rest potentiation (PRP) of force (see FIG. 4D). In contrast, after electrical stimulation, the tissues exhibited a positive FFR profile and PRP of force. PRP of force after pacing at 3 Hz was higher than the force at 3 Hz pacing. As shown in FIGS. 4E-F, excitation threshold voltage (ET) of the tissues decreased, with a significant increase of maximum capture rate (MCR), which demonstrated the improvement of tissue electrical excitability. FIG. 4G shows a decrease of time for contraction and relaxation at 3 Hz pacing after stimulation, illustrating more brisk contractions. The maximum capture rate also increased after electrical stimulation, since stimulated cardiac tissues were captured at 3 Hz, vs unstimulated ones, that were only capturing up to 1 Hz, 7 days after seeding. After 5-week stimulation, the cardiac tissues showed well-aligned sarcomeric structures (see FIG. 4H).

Example Drug-Dose Studies on the Platform

To demonstrate the effects of drug compounds on the cardiac tissues, nifedipine and lidocaine were tested separately in the plate device to observe drug effects on the tissues. With built-in sensors and electrodes, the contractile force of tissues can be measured in situ. Prior to the testing, $Ca^{2+}$ dye fluo-4 NW was added into each well of the device plate and the plate was incubated for 40 min at 37° C.

Figure 5A:
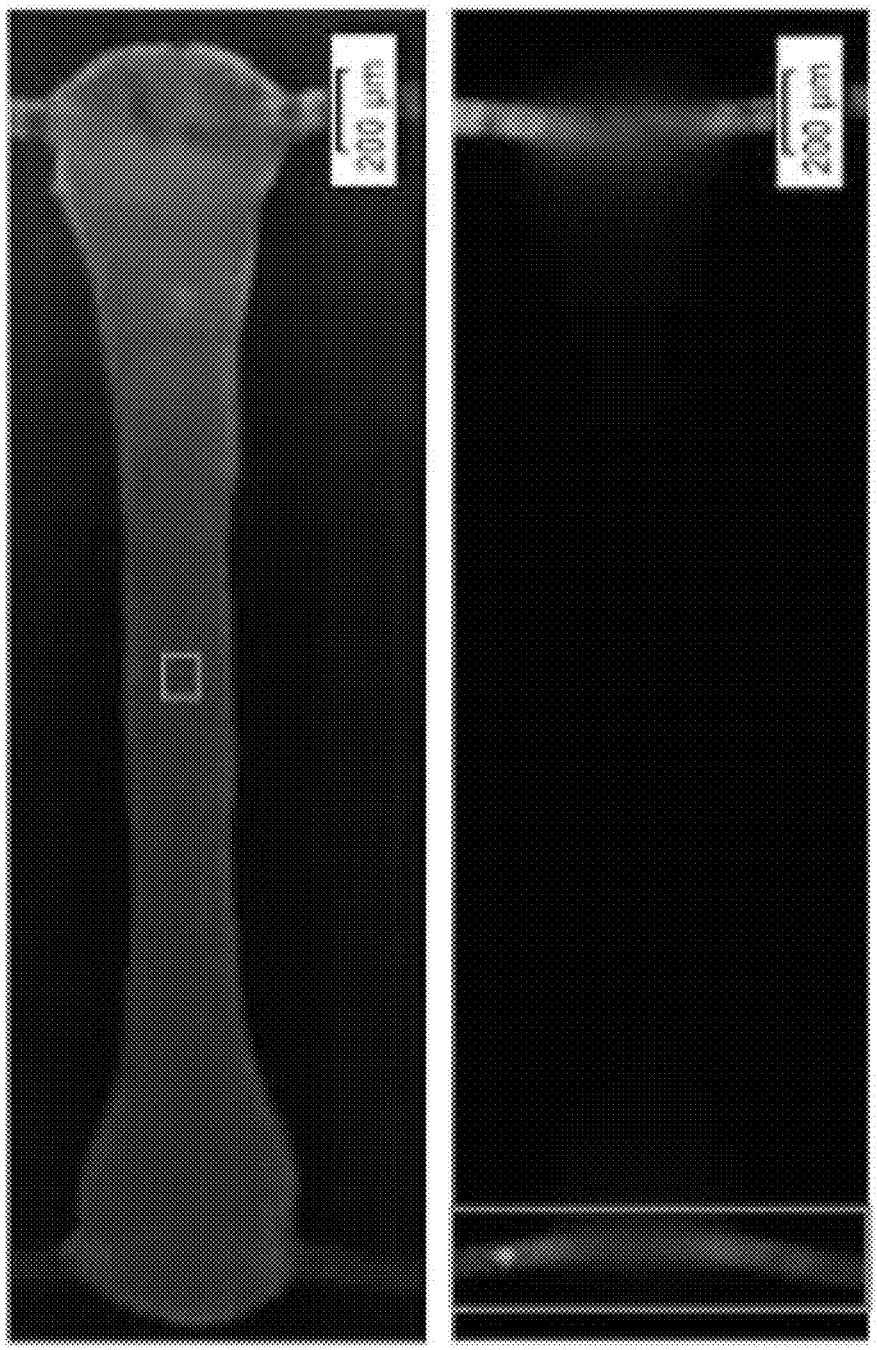
FIG. 5A shows typical image of biowires loaded with a $Ca^{2+}$ dye (Fluo-4) under electrical field stimulation and the fluorescence image of nanocomposite wires, in an example of the present disclosure.

The contractility readouts and $Ca^{2+}$ transients were observed using a fluorescent microscope under Texas Red channel ($\lambda_{ex}$=595 nm, $\lambda_{em}$=615 nm) and green light channel ($\lambda_{ex}$=490 nm, $\lambda_{em}$=525 nm) at 4× magnification (shown in FIG. 5A). For compound testing, compounds with different concentrations from 10 µM to 100 µM were added in each well of the plate device. After 10 min, the responses of cardiac tissues under both channels were recorded. The ImageJ software stack plugin was used to calculate the average intensity of an area of nanocomposite microwires in the tissue. The videos for tracing calcium transients were analyzed using the custom MATLAB software. The ratio of peak fluorescence intensity to baseline intensity of tissues ($dF/F_0$) was calculated to measure the relative changes in intracellular $Ca^{2+}$ response to the drug compound.

Figure 5B:
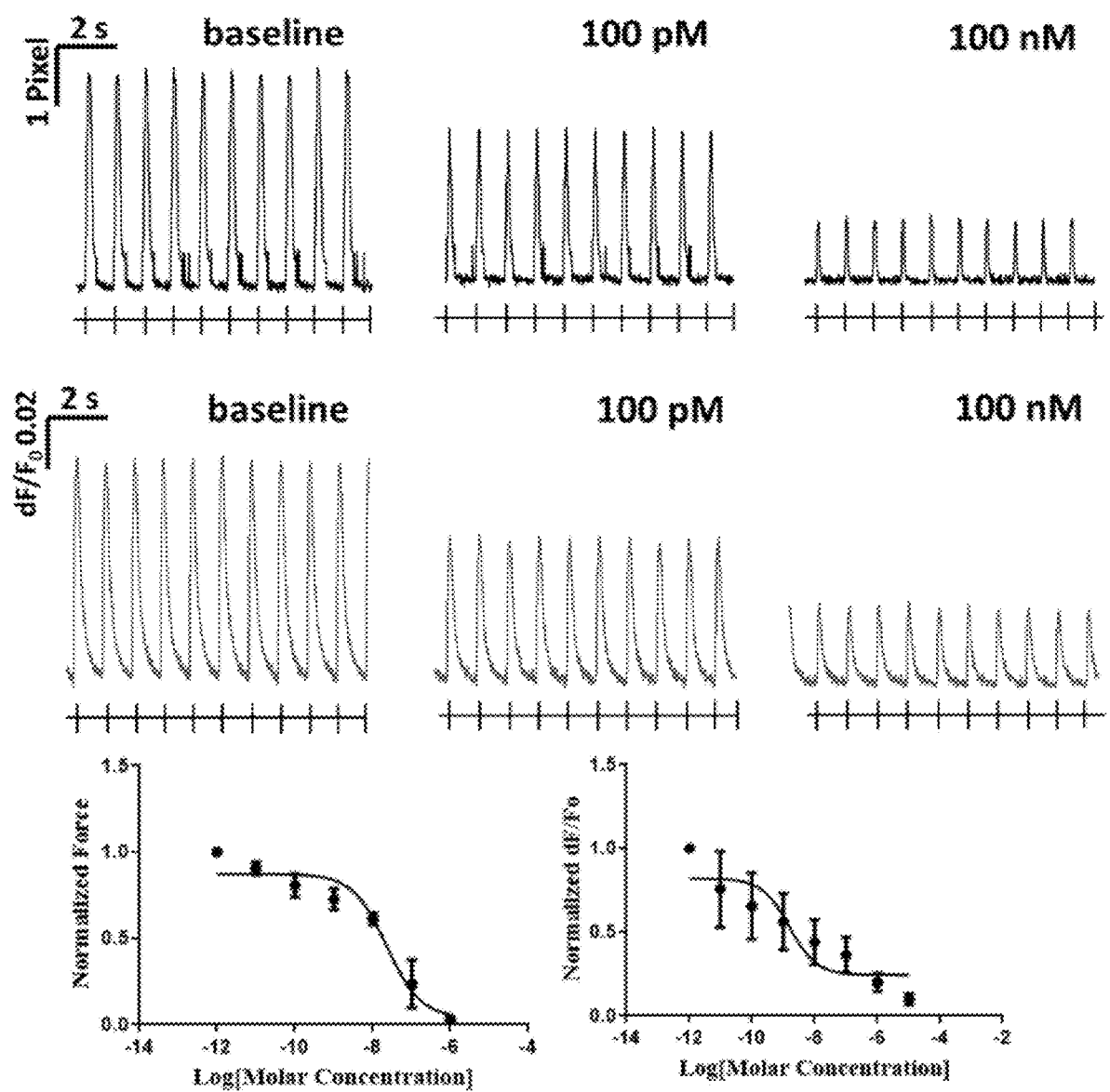
FIG. 5B shows Typical force (black) and $Ca^{2+}$ transients (blue) in cardiac tissues following the treatment with nifedipine, in an example of the present disclosure.
Figure 5C:
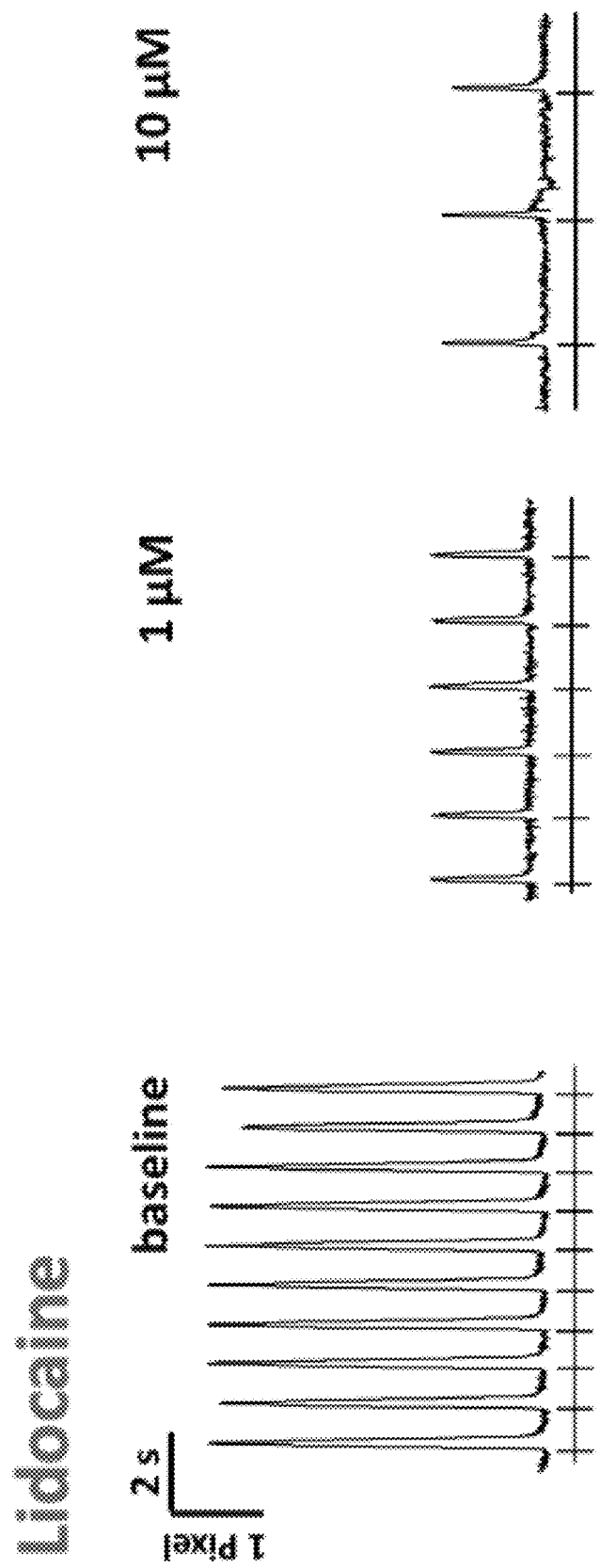
FIG. 5C shows lidocaine and the associated dose response (avg±stdev, n=3), in an example of the present disclosure.

FIG. 5A shows drug responses of cardiac tissues under electrical stimulation through tracing the force and calcium transient of cardiac tissues. A L-type $Ca^{2+}$ channel blocker—nifedipine with concentrations of 100 µM and 100 nM was applied in the plate device, demonstrating a dose-dependent decrease in both force and $Ca^{2+}$ transients of cardiac tissues (see FIG. 5B). As shown in FIG. 5C, a sodium channel blocker lidocaine inhibited electrical excitability of a cardiac tissue, compared with that of the cardiac tissue without adding the compound (baseline). The plate device exhibits excellent capability to generate physiologically relevant tissues, which can have potential application in drug screening.

Modeling Virus Infection and Therapy in the Heart-On-a-Chip Platform

Figure 6A:
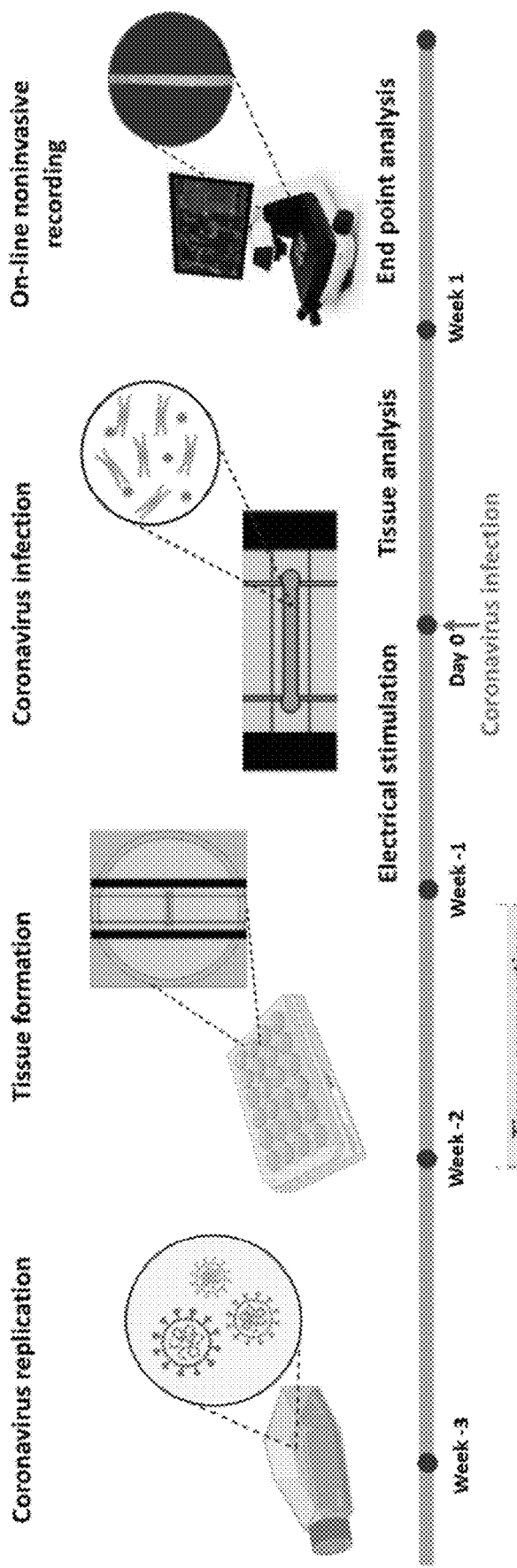
FIG. 6A shows schematics for applying an example heart-on-a-chip platform for SARS-CoV-2 infection study with the timeline for SARS-CoV-2 coronavirus infection of cardiac tissues in 3D printed Biowire platform, in an example of the present disclosure. (All data from BJ1D hiPSC derived cardiac tissues. Data presented as mean±s.d., n≥3, One-way ANOVA)
Figure 6B:
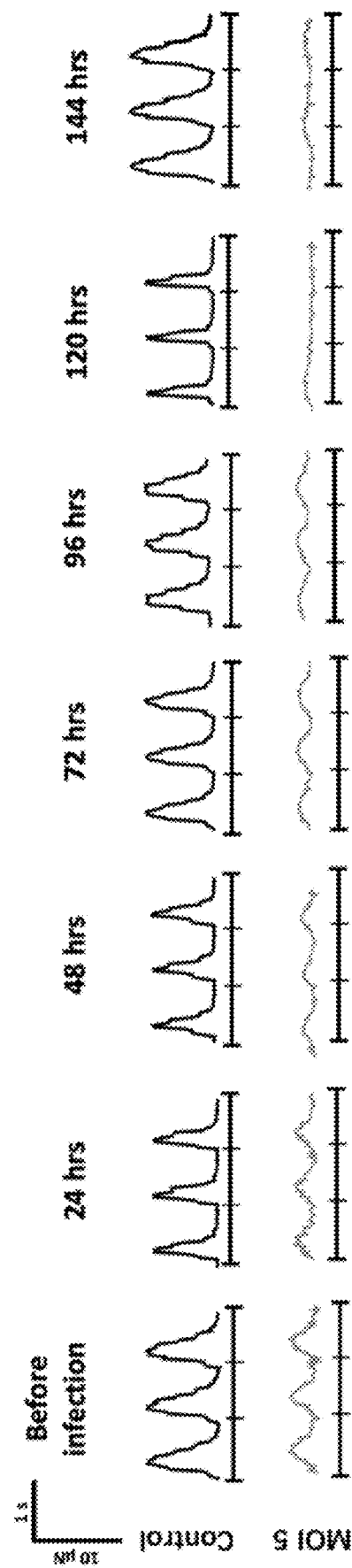
FIG. 6B shows representative force traces of control and SARS-CoV-2 infected tissues at MOI of 5, in an example of the present disclosure. All traces were recorded under 1 Hz stimulation.
Figure 6C:
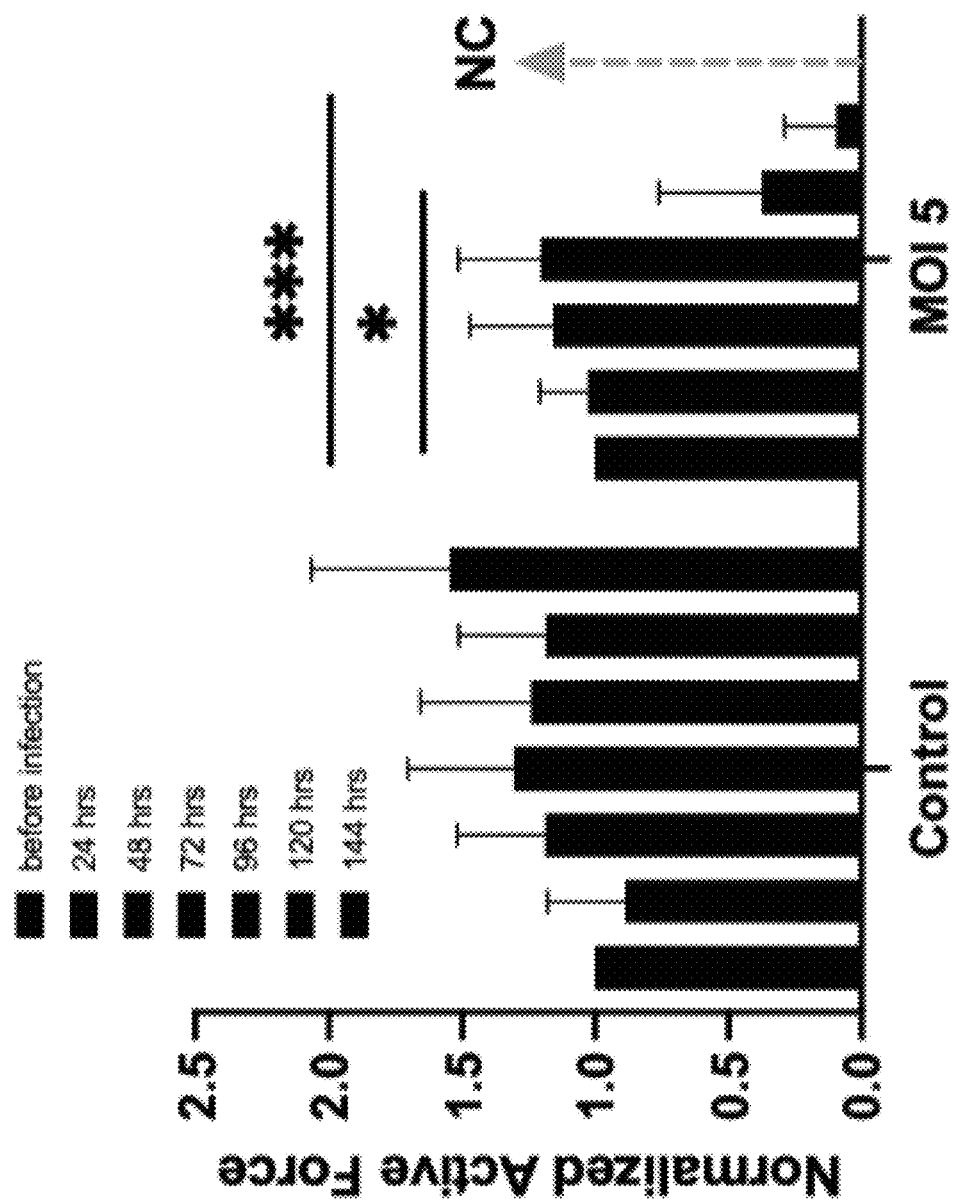
FIG. 6C shows quantification of active force and FIG. 6D of passive tension normalized for each tissue to its baseline before infection, in an example of the present disclosure.
Figure 6D:
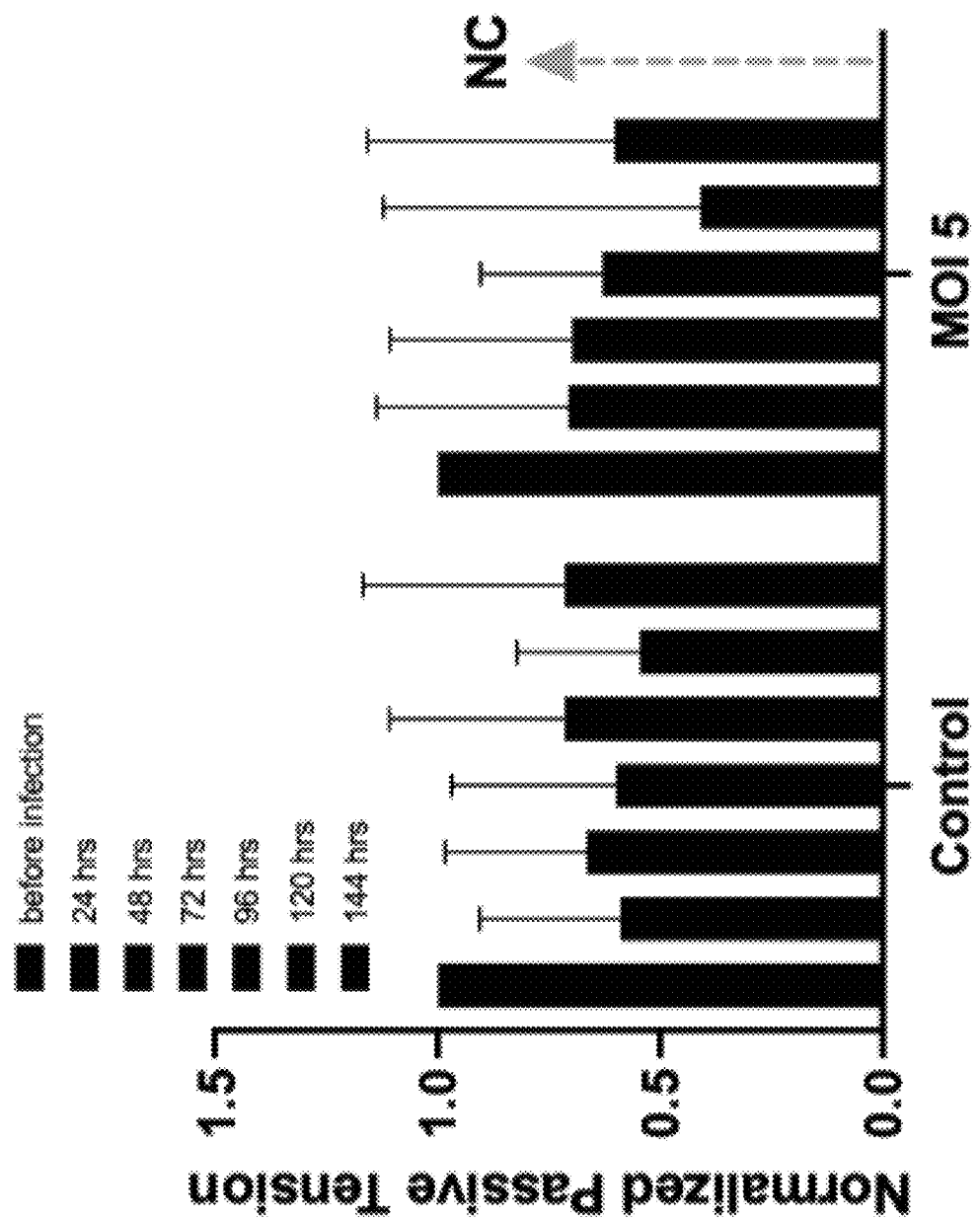
FIG. 6E shows quantification of peak duration, FIG. 6F of time to peak and FIG. 6G of time from peak that were compared before and after SARS-CoV-2 infection, in an example of the present disclosure.
FIG. 6H shows percentage of beating tissues in control and SARS-CoV-2 infected cardiac tissues one week after infection, in an example of the present disclosure.
FIG. 6I shows electron microscopy of non-infected (control) and SARS-CoV-2 infected tissues at MOI of 5 two week after infection, in an example of the present disclosure. White arrow points to sarcomere proteins.
Figure 6E:
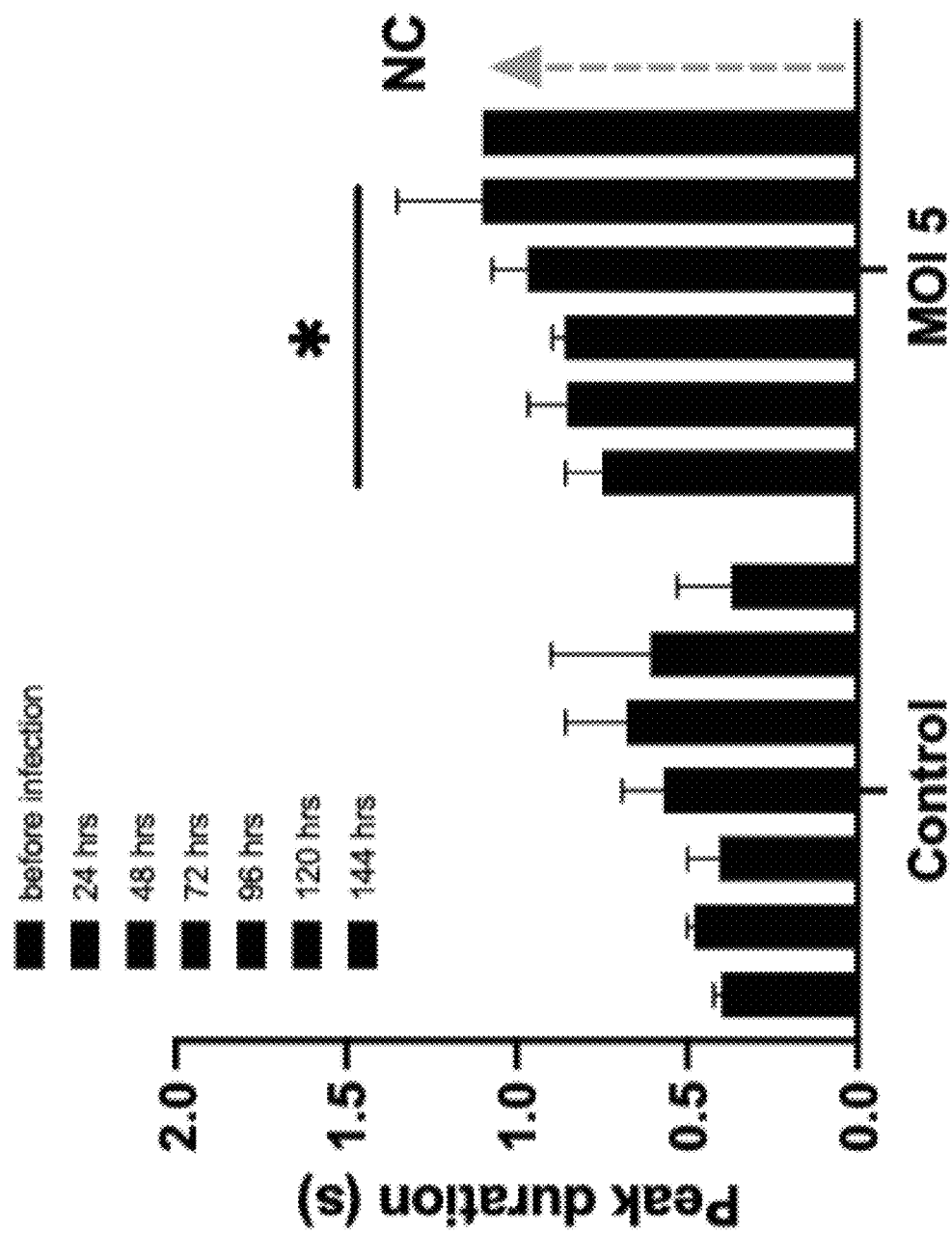
Figure 6F:
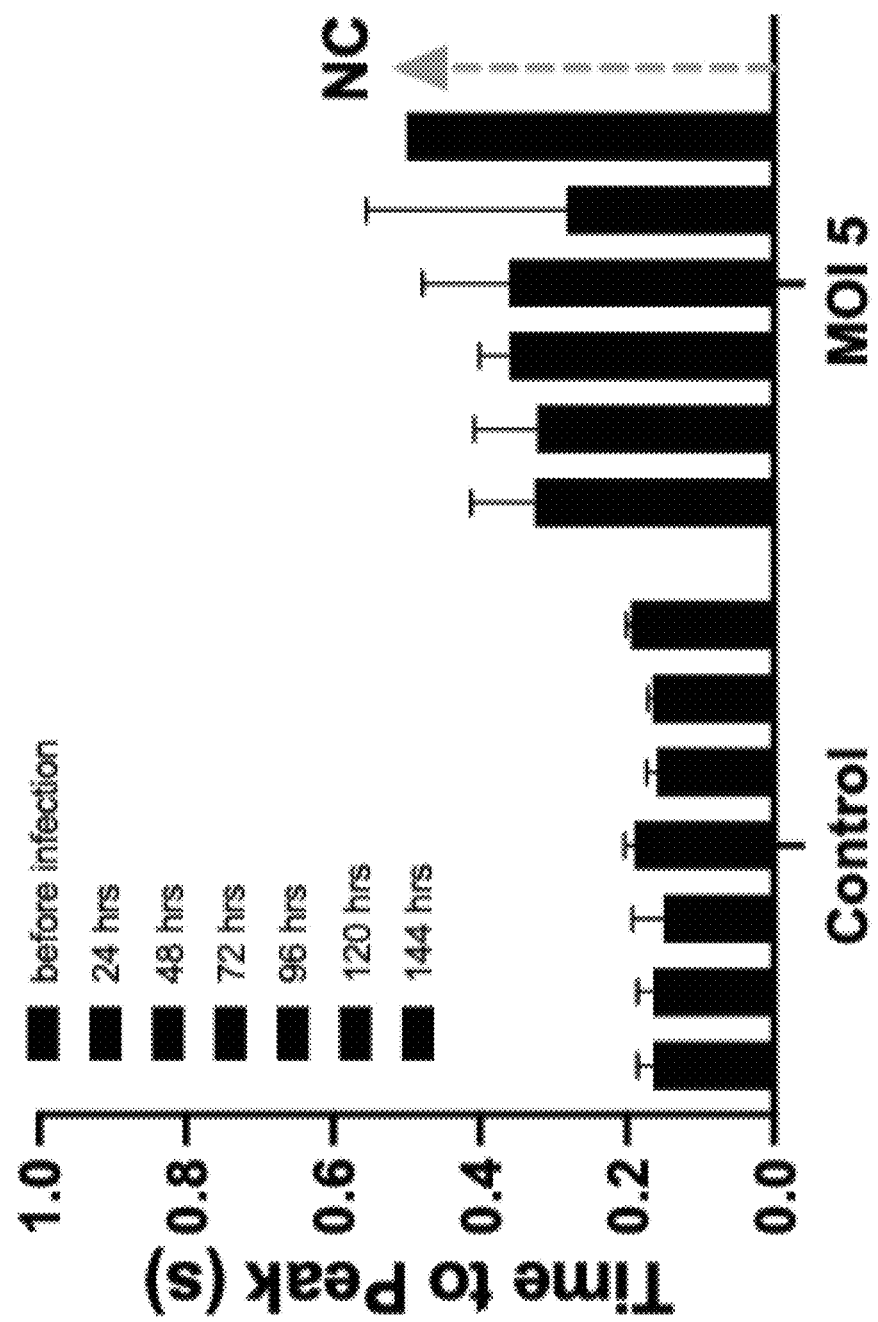
Figure 6G:
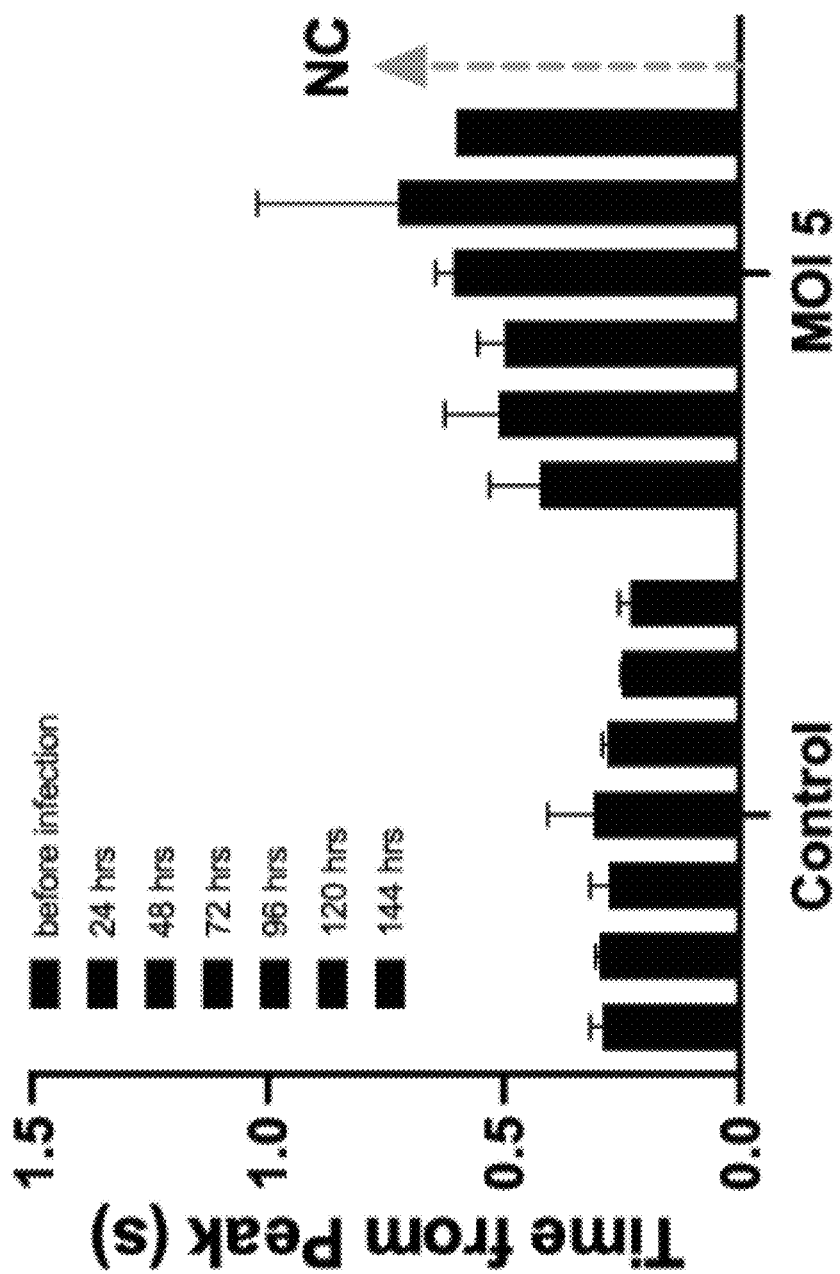
Figure 6I:
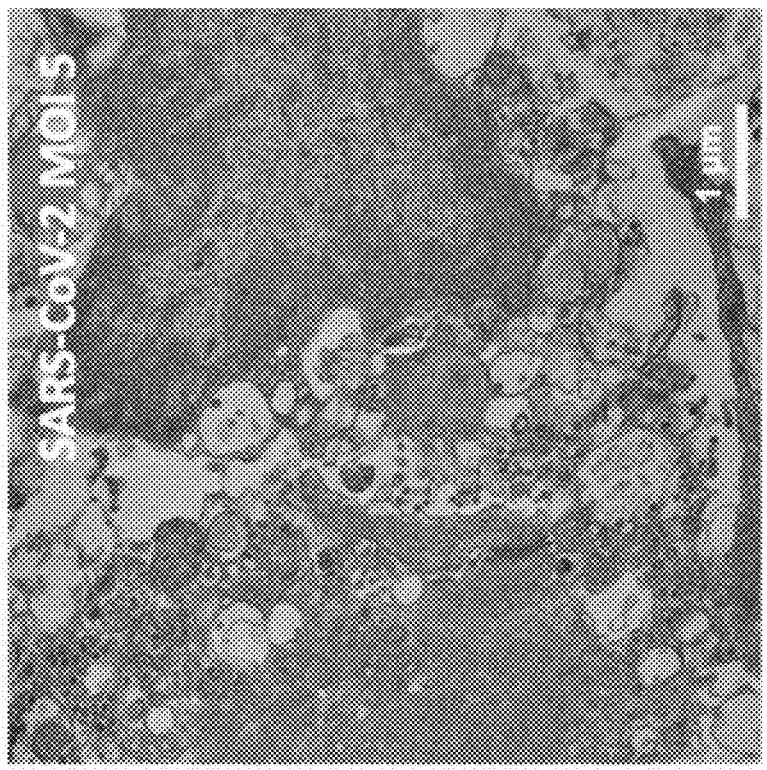
Figure 6I:
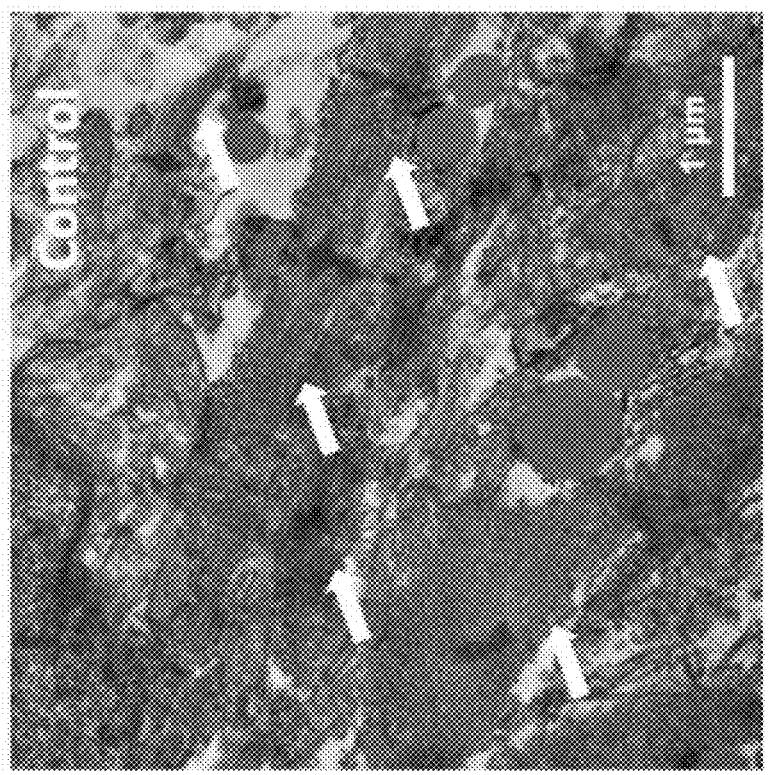

To demonstrate the versatility of the platform, SARS-CoV-2 infection was performed on human myocardial tissue generated from the platform. Cardiac tissues were created by a combination of human induced pluripotent stem cell cardiomyocytes (iPSC-CMs) and human ventricular cardiac fibroblasts (cFB) with collagen-based hydrogel (see FIG. 6) in an array of microwells of the heart-on-chip platform (see FIG. 1). Initially, the seeded cells exhibit tractional forces that result in tissue remodeling and compaction of the hydrogel (Zhao, et al. 2019). After one week of cell-gel compaction to stabilize the tissue size and additional one week of electrical stimulation to promote maturation, the cardiac tissues were exposed to SARS-CoV-2 by introducing the plate into a Containment Level 3 (CL3) facility (see FIG. 6A). The use of this heart-on-a-chip system in the CL3 facility was enabled by the properties of the wire ink that enabled creation of a device without any sharp parts (i.e. no glass) and without parts that could absorb molecules (e.g. PDMS). The SARS-CoV-2 tissues infected with SARS-CoV-2 at the multiplicity of infection (MOI) of 5 progressively lost the ability to contract (see FIGS. 6B-H) and exhibited cells with sarcomere breakdown and vesicles full of the replicating virus (see FIG. 6I).

Discussion

The present disclosure has described examples of composite inks for 3D printing of micro-scale or nano-scale structures. The present disclosure has also described a simple and rapid 3D printing approach for scalable and high-throughput production of micro-scale structures, such as micro-wire arrayed platforms. This manufacturing method allows for 1) an increase the fabrication throughput of heart-on-a-chip device through rapid deposition of microwires in the device, 2) integration of built-in microwire sensors and electrodes conductive for long-term electrical conditioning and 3) reuse of the same plate for multiple tissue cultivations, due to the stability of the nanocomposite ink. The fabrication approach can be scaled up to adapt to 24-well, 96-well or even 386-well plates. Moreover, the resulting composition and plate device has no sharp edges (and does not require the use of materials that could potentially cause sharp edges, such as glass), thus allowing for its use in containment level 3 facilities.

The present apparatus/device may be reused 3-5 times, since TPE has very stable elastic mechanical properties and QDs have long-lifetime fluorescent properties. The material also does not absorb small molecules. TPE/QD wires in the present device are chemically and physically stable for long-term cell culture use. As well, the TPE/QD composition is hydrophobic and the tissues may be removed by mechanical and enzymatic means for reusing the structure for the next cycle of cell culture. In contrast, PoMac is hydrophilic and combines with tissues very tightly, which make the cells more difficult to get rid of. As such, PoMac is not very stable for long term use. As well, the bending angle of wire (because of tissue contraction) was ranging from 5 to 60 degree. However, TPE/QD composition wires do not undergo plastic deformation upon cell culture.

Examples described herein have shown that cardiac tissues can be individually cultured in the multiwell plate device, allowing reliable analysis for applications such as drug testing. The nanocomposite microwire in the device is capable of non-invasively evaluating the contraction behavior of cardiac tissues, through tracking the fluorescence of the microwires. The mechanical properties of soft elastic microwires can be tuned to fulfill the requirements for tissue formation. Built-in electrodes in 24-well plate device can stimulate tissues for 5 weeks to enhance tissue maturation.

The effects of electrical field stimulation on the cardiac tissues were demonstrated to improve the electrical functionality of the 3D cardiac tissues and to drive maturation in the platform. Therefore, the multiwell plate device exhibits an outstanding capability to generate physiologically relevant cardiac tissues as well as to generate high-throughput compatible systems for biomedical applications. Pharmacological compounds were tested to demonstrate a potential of this heart-on-a-chip platform in drug screening. The platform was applied to generate heart-on-a-chip models to evaluate the progression of coronavirus infection, acting as an in vitro surrogate for mirroring the clinical cardiac manifestations of some patients with COVID-19, and to potentially develop cardioprotective interventions against COVID-19 induced cardiac dysfunction.

The present disclosure has provided examples of the disclosed composite, and examples of an application for 3D printing of microwires for a heart-on-a-chip platform. These examples are provided only to help illustrate the disclosed composition and use thereof, and are not intended to be limiting. It should be understood that the disclosed composition may be varied (e.g., using particulate matter other than quantum dots to impart other forms of detectability; used for 3D printing of other micro-scale structures for other biological applications; etc.) within the scope of the present disclosure.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

REFERENCES

Amin, Reza, et al.
2016 3D-printed microfluidic devices. Biofabrication 8(2): 022001.
Banerjee, Arinjay, et al.
2020 Isolation, sequence, infectivity, and replication kinetics of severe acute respiratory syndrome coronavirus 2. Emerging infectious diseases 26(9):2054.
Benayas, Antonio, et al.
2015 PbS/CdS/ZnS Quantum Dots: A Multifunctional Platform for In Vivo Near-Infrared Low-Dose Fluorescence Imaging. Advanced Functional Materials 25(42):6650-6659.
Bilan, Regina, Igor Nabiev, and Alyona Sukhanova
2016 Quantum Dot-Based Nanotools for Bioimaging, Diagnostics, and Drug Delivery. ChemBioChem 17(22):2103-2114.
Chia, Helena N, and Benjamin M Wu
2015 Recent advances in 3D printing of biomaterials. Journal of biological engineering 9(1):4.
Lai, Benjamin Fook Lun, et al.
2017 InVADE: integrated vasculature for assessing dynamic events. Advanced Functional Materials 27(46):1703524.
Lian, Xiaojun, et al.
2013 Directed cardiomyocyte differentiation from human pluripotent stem cells by modulating Wnt/8-catenin signaling under fully defined conditions. Nature protocols 8(1):162.
Lind, Johan U, et al.
2017 Instrumented cardiac microphysiological devices via multimaterial three-dimensional printing. Nature materials 16(3):303.
Maschmeyer, Ilka, et al.
2015 A four-organ-chip for interconnected long-term co-culture of human intestine, liver, skin and kidney equivalents. Lab on a Chip 15(12):2688-2699.
Wang, Ji, et al.
2019 A virus-induced kidney disease model based on organ-on-a-chip: Pathogenesis exploration of virus-related renal dysfunctions. Biomaterials:119367.
Wang, Yaqing, et al.
2018 Human brain organoid-on-a-chip to model prenatal nicotine exposure. Lab on a Chip 18(6):851-860.
Yang, Lei, et al.
2008 Human cardiovascular progenitor cells develop from a KDR+ embryonic-stem-cell-derived population. Nature 453(7194):524.
Zhang, Boyang, et al.
2016 Biodegradable scaffold with built-in vasculature for organ-on-a-chip engineering and direct surgical anastomosis. Nature materials 15(6):669.
Zhao, Yimu, et al.
2019 A platform for generation of chamber-specific cardiac tissues and disease modeling. Cell 176(4):913-927. e18.

The invention claimed is:

1. A composition for extrusion and deposition by a three-dimensional (3D) printer, the composition comprising: a thermoplastic elastomer (TPE), particulate matter having particles in the range of about 5 nm to about 10 μm in diameter, and a solvent comprising at least one of toluene or chloroform, wherein the TPE is poly(styrene-ethylene-butylene-styrene) (SEBS), wherein the composition is useable for 3D printing of a biocompatible micro-scale structure.

2. The composition of claim 1, wherein the particulate matter comprises quantum dots (QDs).

3. The composition of claim 2, wherein the QDs are CdSe/CdS core/shell quantum dots.

4. The composition of claim 2, wherein the QDs are stabilized with octadecylamine ligands.

5. The composition of claim 2, wherein the QDs are in the range of about 3 nm to about 10 nm in diameter.

6. The composition of claim 2, wherein the concentration of QDs by weight in the TPE is in the range of about 0.01% to about 10%.

7. The composition of claim 1, wherein the particulate matter comprises particles having a property to enable detectability based on at least one of:
fluorescence;
conductivity; or
magnetism.

8. The composition of claim 1, wherein the particulate matter comprises at least one of: polystyrene micro-particles, polyester micro-particles, rhodamine, or carbon dot-based fluorophore.

9. The composition of claim 1, wherein the particulate matter comprises at least one of: single carbon nanotubes, multiwall carbon nanotubes, carbon tubes, graphene, gold nanoparticles, silver nanoparticles, or platinum nanowire.

10. The composition of claim 1, wherein the particulate matter comprises at least one of iron oxide nanoparticulate, FePt, NdFeB or SmCo5 alloys, or cobalt nanoparticles.

11. The composition of claim 1, wherein the composition has a viscosity in the range of about 10 $Ns/m^2$ to about 10,000 $Ns/m^2$ under shearing.

12. Use of a composition for 3D printing a biocompatible micro-scale structure, wherein the composition comprises a thermoplastic elastomer (TPE), particulate matter having particles in the range of about 5 nm to about 10 μm in diameter, and a solvent comprising at least one of toluene or chloroform, wherein the TPE is poly (styrene-ethylene-butylene-styrene) (SEBS).

13. The use of claim 12, wherein the micro-scale structure is in the range of about 10 μm to about 200 μm in size.

14. The use of claim 12, for printing micro-wires onto a microwell plate, wherein the micro-wires are about 60 μm in diameter.

15. The use of claim 12, for printing micro-wires onto a microwell plate at a 3D printing speed of about 1 mm/s to about 20 mm/s.

16. The use of claim 15, for printing the micro-wires onto the microwell plate at a 3D printing temperature of about 200° C. to about 220° C., and a 3D printing pressure in the range of about 0.1 MPa to about 0.5 MPa.

17. An apparatus for cultivation of cells, comprising:
   a substrate; and
   a biocompatible micro-scale structure that is extruded and deposited on the substrate using a 3D printing process, wherein a composition is 3D printed on the substrate to create the micro-scale structure, and wherein the composition comprises a thermoplastic elastomer (TPE), particulate matter having particles in the range of about 5 nm to about 10 µm in diameter, and a solvent comprising at least one of toluene or chloroform, wherein the TPE is poly (styrene-ethylene-butylene-styrene) (SEBS).

18. The composition of claim 1, wherein the composition is obtained by:
   mixing the TPE and at least a portion of the particulate matter in the solvent to obtain a nanocomposite solution;
   allowing at least a portion of the solvent to evaporate from the nanocomposite solution; and
   baking a remainder of the nanocomposite solution to obtain the composition.

19. The composition of claim 1, wherein the composition is useable for 3D printing of the biocompatible micro-scale structure that has a Young's modulus in the range of 500-850 kPa.

* * * * *